US009238504B2

(12) United States Patent
Huber et al.

(10) Patent No.: US 9,238,504 B2
(45) Date of Patent: Jan. 19, 2016

(54) CARGO HOLD FLOOR FOR A CARGO HOLD OF AN AIRCRAFT, FUNCTION ELEMENT FOR INSTALLING IN A CARGO HOLD FLOOR, SIDE GUIDE, FIXING DEVICE FOR INTRODUCING A TENSILE LOAD, AND DEVICE FOR EJECTING FREIGHT ITEMS

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 330 days.

(21) Appl. No.: 13/512,082

(22) PCT Filed: Nov. 29, 2010

(86) PCT No.: PCT/EP2010/068382
§ 371 (c)(1),
(2), (4) Date: Jun. 1, 2012

(87) PCT Pub. No.: WO2011/064356
PCT Pub. Date: Jun. 3, 2011

(65) Prior Publication Data
US 2012/0312920 A1 Dec. 13, 2012

(30) Foreign Application Priority Data
Nov. 30, 2009 (DE) .......................... 10 2009 056 302

(51) Int. Cl.
*B64C 1/20* (2006.01)
*B64D 9/00* (2006.01)
(52) U.S. Cl.
CPC .. *B64C 1/20* (2013.01); *B64D 9/003* (2013.01)
(58) Field of Classification Search
CPC ......................... B64D 2009/006; B64D 11/003

USPC ................................ 244/117 R, 118.1, 118.2
See application file for complete search history.

(56) References Cited

U.S. PATENT DOCUMENTS 3,262,588 A   7/1966  Davidson
3,381,921 A * 5/1968  McDonough et al. .......... 410/79
(Continued)

FOREIGN PATENT DOCUMENTS

DE          19627846 A1    1/1998
DE          19627846 C2    1/1998
(Continued)

OTHER PUBLICATIONS

English translation of Written Opinion of the International Searching Authority in PCT application PCT/EP2010/068382, Jun. 5, 2012.
PCT Search Report and Written Opinion of Aug. 4, 2011 in Application PCT/EP2010/068382.

*Primary Examiner* — Brian M O'Hara
*Assistant Examiner* — Keith L Dixon
(74) *Attorney, Agent, or Firm* — Barnes & Thornburg LLP

(57) ABSTRACT

The present invention concerns a cargo hold floor for a cargo hold of an aircraft. The cargo hold floor comprises a multiplicity of panels (110a, 110b) to form the cargo hold floor, wherein the panels have rail segments to form rails extending over several profile panels (120-130, 120'-129') and arranged in a longitudinal direction of the aircraft. The rail segments comprise full seat rail segments (150, 150b) and partial seat rail segments (155a, 155b, 155b, 155b) for fixing of freight loading components. Such full seat rail segments and partial seat rail segments can be used advantageously to anchor freight items to the cargo hold floor or to fasten function elements there.

14 Claims, 18 Drawing Sheets

(56) References Cited

U.S. PATENT DOCUMENTS

Figure 1:
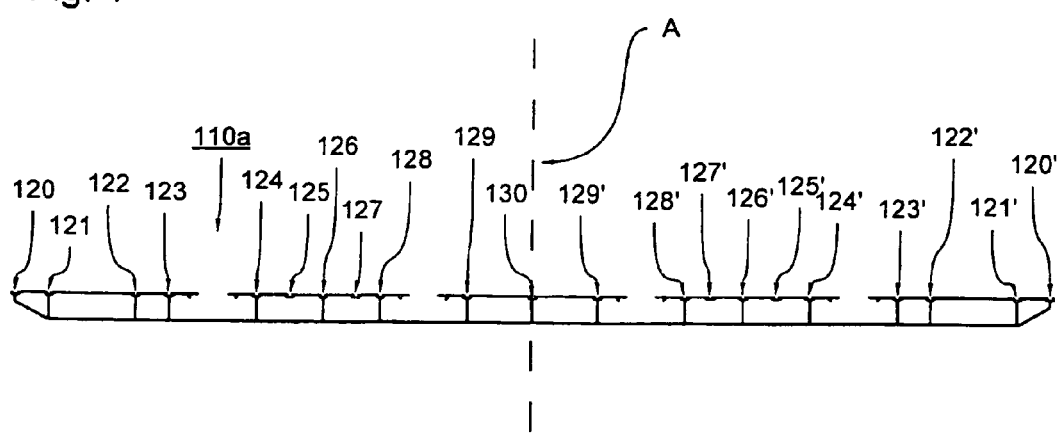

| | | |
|---|---|---|
| 4,000,870 A | 1/1977 | Davies |
| 4,241,890 A | 12/1980 | Pearson |
| 4,457,649 A | 7/1984 | Vogg et al. |
| 4,483,499 A * | 11/1984 | Fronk .................. 244/118.1 |
| 5,090,639 A | 2/1992 | Miller et al. |
| 5,775,641 A * | 7/1998 | Goon .................. 244/118.1 |
| 6,039,288 A * | 3/2000 | Huber et al. .......... 244/118.1 |
| 6,241,185 B1 * | 6/2001 | Sanderson ............ 244/118.1 |
| 6,557,800 B2 * | 5/2003 | Medina et al. ........ 244/118.1 |
| 7,237,749 B2 * | 7/2007 | Ritts et al. ............ 244/118.5 |
| 8,157,210 B2 * | 4/2012 | Huber et al. .......... 244/118.2 |

FOREIGN PATENT DOCUMENTS

| | | |
|---|---|---|
| | 2004/0258498 A1 | 12/2004 Bruns |
| DE | 19720224 A1 | 10/1998 |
| EP | 0649802 A1 | 4/1995 |
| EP | 1406813 B1 | 4/2004 |
| EP | 1481894 A2 | 12/2004 |
| EP | 1481894 A3 | 12/2004 |
| GB | 2043584 A | 10/1980 |
| WO | 2010149180 A1 | 12/2010 |
| WO | 2010149181 A1 | 12/2010 |
| WO | 2011064356 A3 | 6/2011 |

\* cited by examiner

ERSATZBLATT (REGEL 26)

Fig. 20
Fig. 21
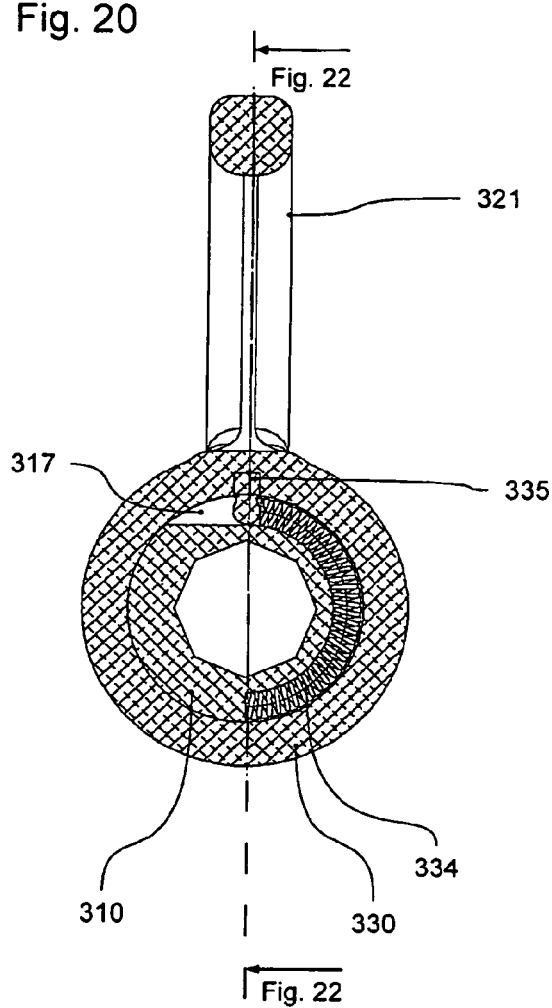
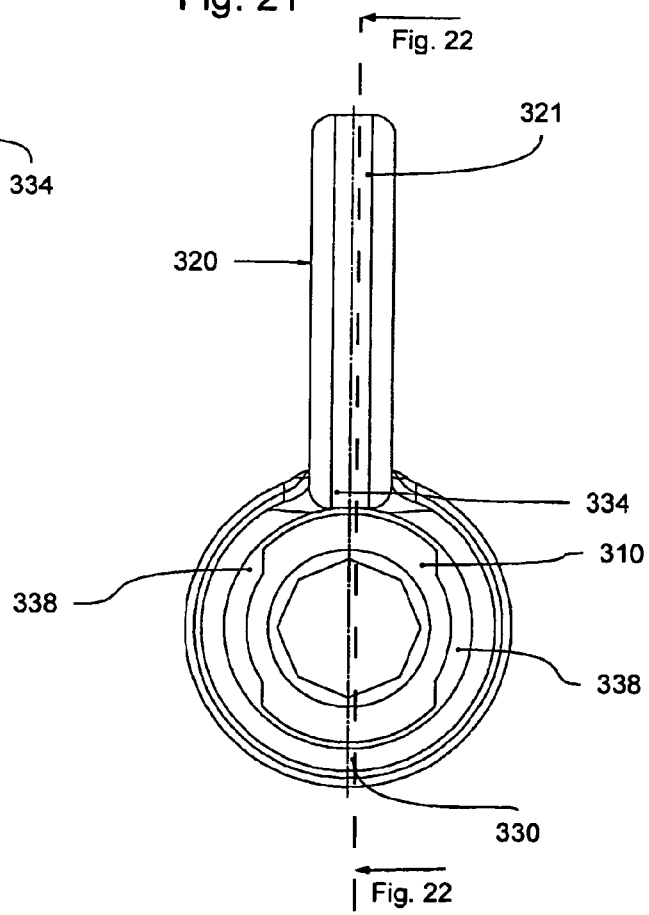

CARGO HOLD FLOOR FOR A CARGO HOLD OF AN AIRCRAFT, FUNCTION ELEMENT FOR INSTALLING IN A CARGO HOLD FLOOR, SIDE GUIDE, FIXING DEVICE FOR INTRODUCING A TENSILE LOAD, AND DEVICE FOR EJECTING FREIGHT ITEMS

RELATED APPLICATIONS

This patent application is a U.S. nationalization under 35 USC §371 of International Application No. PCT/EP2010/068382, filed Nov. 29, 2010, which claims priority to German Patent Application No. 10 2009 056 302.4, filed Nov. 30, 2009. The disclosures set forth in the referenced applications are incorporated herein by reference in their entireties.

The invention concerns a cargo hold floor for a cargo hold of an aircraft, a function element for installing in a cargo hold floor, a side guide for mounting on a cargo hold floor, a fixing device for introducing a tensile load into the cargo hold floor and a device for ejecting freight items.

Both for civil and for military applications, it is often necessary to use aircraft to transport persons but also freight, in particular containers or pallets. Here the cargo holds of the aircraft are fitted with seats or other function units e.g. side guide elements, cross bars, roller units, fixing elements etc. for the most efficient possible use of the hold. As for the operator of aircraft, every minute in which an aircraft cannot be used constitutes an added financial burden, it is necessary to optimise the conversion measures in order to minimise the time required for these. Furthermore the hold, in particular when used to transport freight, should be designed such that loading and unloading processes can be performed as quickly as possible. The function units used should be simple to operate such that no incorrect operation can occur as this can lead to at least partial blockage of the aircraft. Furthermore it is found that the cargo hold and all function units therein are exposed to extreme environmental situations (e.g. high and low temperatures, severe temperature differences, dust, sand, wet conditions etc.). With regard to user-friendliness, it must furthermore be considered that not all airports have qualified operating staff. In particular for military use of aircraft, for example when ejecting equipment into crisis zones, it must be expected that the operating staff will be under great stress so that particularly simple and safe operation of the function units is required.

It will be clear that irrespective of use (military or civil), high requirements are imposed on the safety of the function units since detachment of a seat or slippage of the freight items during flight are unacceptable. The function units used need not only be secure but also lightweight. Heavy function units lead to increased fuel consumption, and reduce the maximum loading capacity and range of the aircraft.

As usual in the industry, for manufacturers of function units and cargo hold floors it is essential to minimise the necessary expense and costs. The production process should be as efficient as possible so that the high quality products can be produced at the lowest possible costs. Important factors for the efficient production are low use of materials, rapid and simple production and an efficient (first) installation.

DE 196 27 846 A1, DE 197 20 224 A1 and EP 0 649 802 A1 disclose cargo hold floors for the cargo holds of aircraft in which panels or similar flat (cargo hold) floor elements are provided for attaching function elements. These are mounted for support on the flat floor of the aircraft or on floor beams or floor supports or similar supporting elements, wherein the supporting elements are joined to a body or a skin of the aircraft. Production of these cargo hold floors is very costly and complex. Furthermore the installation of function units on or to the cargo hold floor constitutes a great problem as an individual fixing must be provided for each function unit. Conversion of a configured cargo hold floor is complex and cost-intensive.

The invention is therefore based on the object of providing a cargo hold floor for a hold of an aircraft which is simple to produce, versatile in use and easy to configure.

This object is achieved by the cargo hold floor according to claim 1.

In particular the object is achieved by a cargo hold floor for a hold of an aircraft which comprises a multiplicity of panels to form the cargo hold floor. The panels have rail segments to form rails extending over several profile panels and arranged in a longitudinal direction of the aircraft, wherein the rail segments comprise full seat rail segments and partial seat rail segments for fixing freight loading components, in particular cross bars or side guide elements.

According to the application the term "seat rail" means a perforated rail with holes arranged thereon which amongst others serves to anchor seats in an aircraft. A full seat rail segment comprises holes arranged regularly over the entire length of the segment to receive seats or other function units. In a partial seat rail segment, the rail has corresponding holes which are not distributed over its entire length. For example only a few holes may be provided arranged at regular or irregular intervals over a relatively large segment. The partial seat rail segments may also be formed such that they are not really suitable for fitting with seats. Preferably the partial seat rail segments are suitable for receiving other function units e.g. cross bars or longitudinal bars.

An essential concept of the present invention is therefore to create a cargo hold floor which has a multiplicity of rails extending in the longitudinal direction of the aircraft that can be fitted with seats or other function units depending on application. These rails are not only the known full seat rail segments but also partial seat rail segments which may possibly be used exclusively to receive freight loading components e.g. side guides, cross bars, roller units, fixing elements or general guide elements. Thus these rails generally serve for fixing function units. The provision of additional bores to attach individual function units at particular positions can be omitted. Configuration of a fully functioning cargo hold with corresponding fittings is very simple. The cargo hold can be converted at any time.

The panels can be formed as extruded panels. In the extrusion method, the panels can be produced very simply and efficiently. The rail segments can be provided in the panels with no additional cost. Thus the panels and corresponding fixing devices for function units can be produced in one working step. The cargo hold floor can comprise in the transverse direction (Y direction) of the aircraft a maximum of 10, in particular maximum 8, in particular maximum 6, in particular maximum 4 panels to form the cargo hold floor. It is advantageous if extrusion profiles as wide as possible are arranged next to each other to form the cargo hold floor.

The cargo hold floor can comprise at least two rails with a slight spacing apart such that at least one freight loading component can be attached therein to receive the forces acting in the transverse direction of the aircraft. The rails can be used particularly sensibly as fixing points for freight loading components if the corresponding element can be anchored in several rails. Thus in particular forces acting in the transverse direction of the aircraft can be advantageously transferred. Damage to the rails by the occurrence of strong forces is avoided. Preferably the rail pairs can be arranged next to each other with spacing of less than 30 cm or less than 20 cm. It is conceivable to provide not only two but several rails e.g. 3 or 4 next to each with slight spacing and therein anchor a function unit across the rails.

The cargo hold floor can comprise a multiplicity of rails arranged in pairs spaced apart such that freight loading components can be attached therein for fixing freight items with standard widths, in particular with a width of approx. 123.5 cm or 143.8 cm or 174.3 cm or 317.5 cm. It is normal to use standardised containers of 88 inch and 96 inch dimensions. Preferably the rails are arranged such that these standardised containers can be attached particularly simply.

The cargo hold floor can comprise additional full seat rail segments and/or partial seat rail segments to hold freight loading components and for use as fixing points. These additional full seat rail segments and partial seat rail segments can be arranged in arbitrary orientation and increase the functionality—flexible configuration—of the cargo hold. It is conceivable to provide full seat and/or partial seat rail segments which do not extend over the total length of a panel but have a significantly shorter length. For example full seat rail segments or partial seat rail segments with a short length, in particular less than 50 cm, in particular less than 30 cm, in particular less than 10 cm can be provided. Preferably these full seat rail segments or partial seat rail segments are used to anchor freight loading components.

The panels can comprise recesses for receiving assembly elements, in particular with additional seat rail segments. Preferably these recesses are formed at least partly over cross members in the cargo hold floor. For various freight loading components e.g. for roller units, it is advantageous to provide large area recesses in which these can be mounted preferably so they can be driven over. It is advantageous if these mounting elements are also fitted with additional full seat rails and/or partial seat rail segments for mounting further function units. Theoretically it is possible to use the recesses exclusively for providing advantageously oriented full seat rails and/or partial seat rail segments in the cargo hold floor. Thus the extruded profiles used need only be reworked very slightly, providing a multiplicity of anchoring options.

The panels can comprise recesses to receive lowerable and/or swivellable function elements, in particular roller units. Such support elements are described in more detail below.

The recesses can be arranged in a grid for the transport of freight items, in particular containers and/or pallets, by means of the support elements.

The cargo hold floor can be formed substantially symmetrical to a plane running in particular centrally in the X-Y plane of the aircraft. It is advantageous if the individual panels are only slightly individualised so that production cost is minimised. Several substantially identical panels can be arranged next to each other to form the cargo hold floor.

The cargo hold floor can have at least one configuration which is flat such that vehicles can drive over it.

The panels can be formed as hollow profiles with several chambers, wherein the chambers are arranged to form a supply and/or discharge system in the panels extending over several panels. The supply system can be designed for connection to a warm air source, in particular to a take-off from a drive turbine of the aircraft. It is advantageous if the individual panels arranged in rows forming the cargo hold floor provide a conduit system which can be used for supply and disposal tasks. For example the cargo hold floor can be heated via the conduit system. Alternatively cables can be guided into the chambers.

The cargo hold floor can comprise at least one rail to receive a side guide at the edge of the cargo hold floor. Normally the side guides are firmly connected with the cargo hold floor. The side rails on the cargo hold floor can ensure that the side guides can later be mounted on the cargo hold floor. Thus the hold floor can be designed versatile.

DE 196 27 846 C2 discloses providing function elements for installation in an aircraft comprising a turning body with at least two function surfaces which have different function units known in themselves, such as active or passive roller units, latch elements, fixing rails, running surfaces or similar. Furthermore turning body holders are known which are formed and mounted in a recess in the aircraft deck such that the turning body is held in the recess and can be fixed optionally with one of its two function surfaces forming the aircraft deck or co-shaping this.

According to DE 196 27 846 C2, this type of function element is used exclusively to provide different function units. The function units are selected and arranged such that the cargo hold floor in which they are used can be used for a particular purpose. It is extremely difficult to reconfigure a corresponding cargo hold floor. For the provision of further freight loading components, either the turning bodies must be exchanged or additional fixings provided. Generally in the production of cargo hold floors, the problem arises that the fixing of freight loading components is complex. The provision of corresponding bores or the welding of freight loading components to the cargo hold floor requires a great deal of time. For flexible fixing, a multiplicity of fixing components is desirable.

Therefore starting from DE 196 27 846 C2 the object arises of providing a function element for installation in a cargo hold floor with a hold deck which allows a more flexible design of the cargo hold floor. Furthermore a corresponding function element set is provided.

The object is achieved by a further invention complex of the application. In particular the object is achieved by a function element for installation in a cargo hold floor with a cargo hold deck comprising:
  a turning body with various function units e.g. active or passive roller units, latch elements, fixing rails, running surfaces,
  at least one turning body holder which can be mounted in a recess in the cargo hold floor to mount the turning body pivotably such that the turning body can be fixed in various function positions, wherein the turning body is structured such that in each function position, another function unit partly forms or co-shapes the cargo hold deck, which is achieved in that at least one turning body holder is formed for anchoring at least one freight loading component e.g. a fixing element, a guide element or similar to the cargo hold floor.

One essential aspect of the present invention therefore lies in the fact that at least one turning body holder is used for anchoring at least one freight loading component. Thus the pivotable turning body can be provided in recesses of the cargo hold floor, wherein additional fixing points for further freight loading components are provided. The provision of fixing points is particularly advantageous on use of extrusion profiles to create the cargo hold floor.

The turning body holder can comprise at least one seat rail segment, in particular a full seat rail segment and/or a partial seat rail segment for anchoring the at least one freight loading component. It is advantageous if an easily releasable connection can be created between the turning body holder and the freight loading component so that the freight loading component can easily be mounted and removed. Freight loading components are known which can be anchored easily removably in corresponding, preferably standardised, full and/or partial seat rail segments.

The turning body can comprise a roller unit and a running surface as function units. Thus the cargo hold floor can be used firstly to transport freight items and secondly can be walked over freely.

The roller unit can comprise at least one roller rotatable about a roller rotary axis and arranged such that the roller rotary axis of the roller is tilted in relation to a plane spanned by the running surface and in particular has an intersection angle of less than 60°. By tilting the roller unit in relation to the running surface, with the same roller thickness roller units are created which have a greater width. The pivotability of the turning body is unaffected.

The running surface can comprise a fixing element which can be lowered therein, in particular with a fixing ring (e.g. a fixing device according to claim 1 of claim set 5).

The at least one turning body can be formed such that the turning body holder can be connected with the cargo hold floor, in particular with a hold underside of the cargo hold floor. Preferably this connection is a bolted connection. Thus the turning body holder can be optimally integrated in the cargo hold floor. The turning body can comprise a turning body lock for fixing the turning body in relation to the cargo hold floor in its individual function position. The turning body lock is preferably arranged and designed such that it is accessible from a hold deck top side in the function position.

The at least one turning body holder can be designed for at least partial holding of two turning bodies. Thus it is possible to mount two turning bodies at least partly on one turning body holder.

The object cited initially is also achieved by a function element set with a multiplicity of the described function elements, wherein the function element set comprises n+1 turning body holders to hold n turning bodies, the turning bodies and turning body holders being arranged alternately in a row, wherein at least the turning body holders between two turning bodies are formed such that they hold two adjacent turning bodies, wherein in each case one turning body is held by two turning body holders. Thus a multiplicity of turning bodies can be held and anchored in the cargo hold floor with minimum expense.

The turning bodies can here be designed such that they can rotate and be locked individually. However it can also be sensible to group the turning bodies into groups such that they can be rotated and/or locked as a unit so that entire sections e.g. a complete stowage point for a pallet can rapidly be configured.

U.S. Pat. No. 4,457,649 discloses a side guide which can be anchored in two seat rails. This side guide requires a great deal of space and cannot be configured. Furthermore the guide elements individually provided thereon are unsuitable for guiding freight items reliably in the longitudinal direction of the aircraft and fixing these.

Starting from this prior art, the object of the present invention is to provide a side guide for mounting on a cargo hold floor of an aircraft, wherein this side guide can be used safely and easily.

This object is achieved by a further invention complex of the application.

In particular the object is achieved by a side guide for mounting on a cargo hold floor of an aircraft for guiding freight items, in particular containers and/or pallets, in the longitudinal direction of the aircraft, wherein the side guide comprises:

at least one foot element to introduce the forces acting into the cargo hold floor, wherein the foot element has fixing elements for fastening the side guide in at least one seat rail, and at least one guide element arranged on the foot element with at least one guide surface for guiding the load, wherein the guide element is connected at least partially removably with the foot element.

An essential concept of the present invention is that the guide element is connected removably with the foot element in order to equip a cargo hold floor easily with a corresponding guide element. The removability of the guide element can lead to the cargo hold floor being suitable for walking and/or driving over when it is removed. With the side guide according to the invention, this can be a function unit which is arranged centrally or at any arbitrary point on the freight deck in order to guide the freight items in the longitudinal direction (e.g. "centre guide"). The side guide can comprise at least two foot elements and the guide element at least one guide rail which is attached to the foot element. Thus a side guide can be provided with a large area guide rail, wherein the guide rail can easily be installed and removed. In the removed state as already stated, the cargo hold floor with the side guide can be walked or driven over. Thus the cargo hold floor in removed state can be loaded with any load objects, for example also with vehicles.

At least one fixing element can comprise a fast catch lock for fixing the fixing element in the seat rail. Thus the foot element can be mounted removably on the cargo hold floor. The fast catch lock ensures rapid and simple installation.

The guide rail can comprise a protrusion cooperating with an edge region of at least one freight item for fixing the freight item in a vertical direction of the aircraft. Thus the side guide can be used not only to guide the freight items but also to fix them.

The side guide can comprise at least one latch element with a latch lug which is arranged and formed such that the latch lug can be brought from a rest position into a locked position to fix a freight piece in the guide element. The latch element can also be used to fix the freight items, guided to their position by means of the side guide, after assuming this position, also in the longitudinal direction of the aircraft. I.e. movement of the load towards the tail or nose of the aircraft is suppressed.

The latch element can be arranged and formed on the guide element such that the latch lug can swivel in a plane perpendicular to a horizontal guide surface of the guide element between a rest position and the locked position. Preferably the guide task of the side guide in the longitudinal direction of the aircraft is performed by a vertical guide surface which extends in the vertical direction along the longitudinal direction of the aircraft. In an advantageous arrangement of the latch element, the latch lug can be swivelled perpendicular to a horizontal guide surface which at least partly receives the base of the freight items. Preferably the freight items are fixed in that the latch lug engages from below into the side guide. Frequently the latch elements with their mechanical components are relatively large so they require sufficient space. The cargo hold can be designed very advantageously if the latch elements are mounted preferably slightly obliquely below and not to the side of the guide rails, as the cargo hold can be used over the entire width.

The latch lug of the latch element can be formed in at least two pieces with a first and a second latch lug element, each of which can be brought with a stop surface into engagement with a stop edge of an engagement recess of the freight items, wherein the latch lug elements are mounted mobile such that the two stop surfaces move away from the stop edges on movement from the locked position into the rest position. An essential point of this aspect of the invention is that the stop surfaces which can be brought into engagement with a stop edge of the engagement recess of the freight items, move away from the opposing stop edges on removal of the latch lug elements from the engagement recesses. The space taken up by the latch lug elements is thus reduced on lowering and hence also the risk of seizing of the latch lug in the engagement recess is substantially reduced. Even if the freight item exerts a force on the latch lug, this can be retracted with low force. This is particularly advantageous if the freight items have to be unloaded quickly and reliably (e.g. ejection during flight).

The latch lug elements can be connected together in opposing synchrony such that on movement of one latch lug element, the other latch lug element is carried with it. This ensures that both latch lug elements of a latch lug always move simultaneously and more or less in synchrony. Furthermore the latch lugs can be designed mechanically substantially simpler as the individual latch lug elements are mutually supporting and only one of the latch lug elements need be activated to change the position of the latch lug.

The latch element can comprise a fixing device for fixing the latch lug in the locked position and/or the rest position. This fixing device prevents the unintended movement of the latch lug from one position to the other. In one embodiment the fixing device comprises at least one fixing spring element for catching the fixing device in the locked position and/or rest position of the latch lug. Amongst others this has the advantage that the latch lug can be fixed in the locked position and/or rest position without further intervention.

Preferably the side guide is formed for mounting on the side of the cargo hold floor.

EP 1 406 813 B1 discloses a side guide installed in a cargo hold to guide freight items along the longitudinal direction of the aircraft. The side guide comprises roller units which facilitate guidance of the freight items. A correspondingly equipped cargo hold floor is very difficult to convert such it can be used for other purposes. In particular when driving vehicles onto the cargo hold floor or when walking on the cargo hold floor, the side guides are extremely disruptive. A correspondingly equipped cargo hold cannot be used either to transport people or vehicles.

It is therefore the object of the present invention to provide a side guide for attaching to a cargo hold floor of an aircraft which allows a flexible configuration of the cargo hold floor. Furthermore a corresponding cargo hold floor element with corresponding side guide is provided.

This object is achieved by a further invention complex.

In particular the object is achieved by a side guide for attaching to a cargo hold floor of an aircraft to guide freight items in the longitudinal direction of the aircraft, wherein the side guide comprises:
- at least one foot element to introduce the forces acting into the cargo hold floor,
- at least one guide element arranged on the foot element to guide the freight items,
- at least one latch element with a latch lug arranged and formed such that the latch lug can be moved from a rest position into a locked position to fix a freight item in the guide element, wherein the guide element is arranged pivoting on the at least one foot element in order to swivel the guide element between a guide position to guide the freight items and a storage position, wherein the guide element and the foot element in the storage position form a substantially flat surface which can be driven and/or walked on.

One essential concept of the present invention is therefore that the guide element can be swivelled between the guide position and the storage position, wherein the guide element and the foot element in the storage position form a substantially flat surface that can be walked and/or driven on. Thus the guide element in folded and/or lowered stated does not protrude into the cargo hold. A further advantage is that the foldable or lowerable guide element has a latch element for fixing the freight items in the longitudinal direction. The side guide according to the invention can be a function unit which is arranged centrally or at any arbitrary point on the freight deck to guide the freight items in the longitudinal direction (e.g. centre guide).

The guide element can have a vertical guide surface and a horizontal guide surface, wherein the at least one latch element is arranged and formed on the guide element such that the latch lug in the locked position protrudes substantially parallel to the vertical guide surface above the horizontal guide surface and/or perpendicular to the horizontal guide surface. The vertical guide surface extends preferably vertically to the cargo hold floor along the longitudinal axis of the aircraft and is designed to guide the freight items in this longitudinal direction. The horizontal guide surface can be formed at right angles to the vertical guide surface. Preferably the horizontal guide surface is slightly tilted in relation to the freight deck or cargo hold floor and forms a ramp to hold the base of the freight items. Freight items approaching the side guide from the side are guided securely on the vertical guide surface. Because of the ramp-like shape, the freight items cannot become jammed. If the latch element with its mechanics is arranged slightly oblique to the vertical guide surface, the side guide can also be designed relatively compact in the vertical direction. The latch element can be designed and arranged such that this engages in the guide element from below i.e. from below the horizontal guide surface.

In an advantageous arrangement of the latch element, the latch lug can be swivelled perpendicular to a horizontal guide surface. Preferably the freight items are fixed in that the latch lug engages from below into the side guide. Frequently the latch elements with their mechanical components are relatively large so they require sufficient space. The cargo hold can be designed very advantageously if the latch elements are mounted below and not to the side of the guide rails, as the cargo hold can be used over the entire width.

The guide element can comprise a guide protrusion which on guidance of the freight items engages in a groove on the freight items provided for this or surrounds a base freight item to absorb forces in the vertical direction in relation to the cargo hold floor. This side guide thus serves not only to guide the freight items but also to attach these to the cargo hold floor. The guide protrusion can prevent the guide items from being lifted out of the side guide upwards (Z direction).

The guide element can comprise a cover surface and at least one support element, wherein the support element is formed such that in the storage position, to form at least one segment of the walkable and/or driveable surface, the cover surface rests against the foot element and/or the cargo floor. In the storage position the cover surface thus forms the walkable or driveable surface at least in segments. The cover surface here is supported by the supporting element which transfers the forces acting on the cover surface into the cargo hold floor or the aircraft. This makes the side guide according to the invention very robust.

The at least one support element and/or a rotary joint provided for swivelling a guide element can be formed such that the guide element can be pivoted by less than 90° in relation to the guide position to assume a storage position.

The cover surface can be actively connected with the vertical guide surface and can be tilted in relation to the vertical guide surface to transfer the forces acting on the vertical guide surface into the foot element and/or into the cargo hold floor. The cover surface thus forms a type of cross bracing which in the guide position—when the vertical guide surface is substantially perpendicular to the cargo hold floor—transfers the forces acting on the vertical guide surface at an angle to the foot element and/or cargo hold floor. Thus the side guide can be designed substantially more robust and absorb larger forces in the transverse direction (Y direction).

The latch lug of the latch element can be formed in at least two pieces with a first and a second latch lug element, each of which can be brought with a stop surface into engagement with a stop edge of an engagement recess of the freight items, wherein the latch lug elements are mounted mobile such that the two stop surfaces move away from the stop edges on movement from the locked position into the rest position. An essential point of this aspect of the invention is that the stop surfaces which can be brought into engagement with a stop edge of the engagement recess of the freight items, move away from the opposing stop edges on removal of the latch lug elements from the engagement recesses. The space taken up by the latch lug elements is thus reduced on lowering and hence also the risk of seizing of the latch lug in the engagement recess is substantially reduced. Even if the freight item exerts a force on the latch lug, this can be retracted with low force. This is particularly advantageous if the freight items have to be unloaded quickly and reliably (e.g. ejection during flight).

The latch lug elements can be connected together in opposing synchrony such that on movement of one latch lug element, the other latch lug element is carried with it. This ensures that both latch lug elements of a latch lug always move simultaneously and more or less in synchrony. Furthermore the latch lugs can be designed mechanically substantially simpler as the individual latch lug elements are mutually supporting and only one of the latch lug elements need be activated to change the position of the latch lug.

The latch element can comprise a fixing device for fixing the latch lug in the locked position and/or the rest position. This fixing device prevents the unintended movement of the latch lug from one position to the other. In one embodiment the fixing device comprises at least one fixing spring element for catching the fixing device in the locked position and/or rest position of the latch lug. Amongst others this has the advantage that the latch lug can be fixed in the locked position and/or rest position without further intervention.

The side guide can comprise at least one movement lever or a connection for a movement lever to move the lock latch lug out of the rest position into the locked position. Thus it is possible to activate the latch lug manually.

The side guide can have an electric and/or pneumatic and/or hydraulic drive at least to move the latch lug out of the rest position into the locked position. It is thus possible to move the latch lug via a control device. An electric drive is preferred.

The latch element can be arranged on the guide element pivotably therewith.

Said object is also achieved by a cargo hold floor element with at least one of the side guides already described, wherein the foot element is formed as an integral part of the cargo hold floor element. Parts of the side guide, in particular the foot element, can reinforce the hold floor element. On an integral connection between the cargo hold floor element and the foot element, the forces acting can be transferred directly to the cargo hold floor. Mounting the side guide in the cargo hold floor is very simple.

Fixing devices are known for introducing a tensile load to a cargo hold floor. For example in some cargo hold floors there are integrated rings to which hooks or cables can be attached to secure freight items to the hold floor. Corresponding rings can be aligned for suitable utilisation of the cargo hold floor so that the tensile load is transferred optimally to the hold floor. Often however the utilisation or configuration of the cargo hold deck changes so that the tensile load no longer acts on the fixing device from the intended direction. This can lead to damage of the fixing device and release of the freight items. Furthermore it must always be possible to drive over corresponding fixing devices so that the freight items can be moved over such fixing devices to their destination positions. With conventional fixing devices, frequently damage occurs to the cargo hold floor or the freight as the fixing devices protrude into the cargo hold deck.

Starting from this prior art the object of the present invention is to provide a fixing device for introducing a tensile load into a cargo hold floor, which can be used efficiently to fix freight items and is simple to operate.

This object is achieved by a further invention complex.

In particular the object is achieved by a fixing device for introducing a tensile load into a cargo hold floor, wherein the fixing device comprises:
   an anchoring part for attaching to the cargo hold floor,
   a fixing element, in particular a hook or an eye, to receive the tensile load,
   a ball joint for articulated connection of the anchorage with the fixing element, wherein the ball joint is designed such that the fixing element can be brought out of a rest position into a working position.

By the provision of a ball joint between the anchorage and the fixing element, the fixing element can always be oriented so that the tensile load is transferred optimally to the anchoring part and hence to the cargo hold floor. Furthermore a correspondingly pivot-mounted fixing element can be driven over irrespective of approach direction so that it can fold away in case of doubt. The fixing element can also deflect in any direction, whereby damage to the fixing device is avoided.

The fixing device can be formed such that the fixing element can be driven over in the rest position. Preferably a receptacle is provided which receives the fixing element in the rest position so that this is lowered into the cargo hold deck. In any case the fixing element in the rest position is below a loading level so that loading and unloading processes are not disrupted.

The fixing device can comprise a spring element which is arranged and formed such that it pretensions the fixing element in the rest position. Thus the spring element moves the fixing element automatically to the rest position when no tensile loads are acting on the fixing element.

The anchoring can comprise an axial bearing that can be connected to the cargo hold floor and has a bearing ring with an outer casing surface extending substantially rotationally symmetrical about a rotation axis, wherein the outer casing surface has a substantially convex constant curvature and the fixing element comprises a counter bearing ring which, to form the ball joint, surrounds the bearing ring at least in segments and has a concave inner casing surface formed corresponding to the bearing ring. The ball element according to the invention can thus advantageously be formed by the bearing ring and the counter bearing ring.

For at least partial formation of the inner casing surface, the counter bearing ring can have two, in particular circular, shoulder segments with an inner diameter which is smaller than the outer diameter of the bearing ring, wherein the shoulder segments are interrupted in portions for insertion of the bearing ring. The shoulder segments thus form the edge regions of the circular inner casing surface and are interrupted so that the bearing ring can be laid in the counter bearing ring on mounting of the fixing device.

Preferably at least one of the two shoulder segments comprises two interruption portions for mounting the bearing ring which are provided opposite each other in the counter bearing ring and have an interruption inner diameter which is greater than or equal to the outer diameter of the bearing ring. Thus the bearing ring can easily be inserted in the counter bearing ring.

The interruption segments are formed substantially corresponding to a profile of the bearing ring. This profile is preferably a concave bulge which allows insertion therein of the bearing ring twisted by 90° against the counter bearing ring.

The fixing device can comprise a linear axial element to form an axial bearing which can be inserted removably in the bearing ring. This axial element can advantageously be used to connect the bearing ring with the cargo hold floor. Preferably the connection is rotationally fixed.

The bearing ring can have an inner profile which is formed corresponding to the axial element in order to attach the bearing ring rotationally fixedly to the cargo hold floor. The rotationally fixed attachment of the bearing ring to the cargo hold floor allows provision of the mechanism already described which pretensions the fixing element in the rest position.

The inner profile can be a polygonal profile.

The fixing device can comprise a seal to seal the ball joint against external influences.

U.S. Pat. No. 4,241,890 discloses an aircraft with a loading system which allows freight items to be ejected during flight. Such aircraft are used both in the civil and in the military sector. To eject the freight items during flight, a tailgate or cargo hold hatch is opened and the freight items are ejected via the tailgate.

The tailgate can form part of the cargo hold floor and is then equipped with roller tracks or similar elements for easier transport of the freight items. There are various methods of accelerating the freight items for ejection. Firstly parachutes are thrown from the aircraft which pull the load from the cargo bay, secondly the aircraft is inclined such that gravity or other acceleration forces drive the freight items towards the tail. For controlled ejection of the freight items it is necessary for these to be guided as well as possible until they definitively leave the aircraft. If one of the freight items becomes jammed during ejection, this can have catastrophic consequences.

It is therefore the object of the present invention to provide a function element for secure guidance of freight items during the ejection process.

This object is achieved by a further invention complex.

In particular the object is achieved by a side guide for attaching to a cargo hold floor of a tailgate of an aircraft, wherein the side guide is formed to guide freight items, in particular containers and/or pallets, in the longitudinal direction of the aircraft and comprises at least one linear guide element, wherein the guide element has a vertical guide surface and at least one guide protrusion which on guidance of the freight items engages in a groove provided therefor on the freight items or surrounds a base of a freight item to absorb forces in the vertical direction in relation to the cargo hold floor, the guide element having a retaining segment and an ejection segment for ejection of the freight items, wherein in the ejection segment the freight items are not fixed in the vertical direction by the at least one guide protrusion.

An essential concept of the invention therefore lies in that a side guide is provided on the tailgate or in the tail region of the aircraft which extends substantially along the longitudinal direction of the aircraft and provides a corresponding vertical guide surface which guides the freight items along the longitudinal direction. Rotation of the freight items in the X-Z plane of the aircraft is prevented because of the vertical guide surfaces. Viewed in the longitudinal direction, the side guide has two segments namely the retaining segment and the ejection segment. In the retaining segment at least one guide protrusion is provided which holds the freight items and guides them such that they cannot be lifted out of the side guide. The vertical guide protrusion thus absorbs forces acting in the vertical direction to the cargo hold floor. This prevents the freight items from being lifted up by a parachute early and hitting the aircraft structure. This could lead to damage to the aircraft and in the worst case seizing of the freight items. In the ejection segment of the side guide there is no guide protrusion which fixes the freight items in the vertical direction. Thus in this region the load can be lifted out of the side guide in a controlled manner.

The at least one guide protrusion can extend substantially over the entire length of the retaining segment. This means that the guide protrusion is arranged substantially continuously in the retaining segment along the longitudinal direction of the aircraft. Thus in this region an efficient guidance can be guaranteed. Furthermore this region can possibly be used as a stowage point for freight items during the flight, to ensure optimum use of the cargo hold.

The side guide can comprise at least one foot element to transfer the forces acting to the cargo hold floor, wherein the guide element is arranged pivoting on the at least one foot element to swivel the guide element between a guide position to guide the freight items and a storage position, wherein the guide element and the foot element in the storage position form a substantially flat, walkable and/or driveable surface. Thus it is possible to fold up the side guide so as to form a driveable or walkable surface. Insofar as non-standardised freight items e.g. containers or pallets are loaded in the hold, it can be advantageous to fold away the side guide according to the invention so that this does not disruptively hinder loading or unloading.

The guide element can comprise a cover surface and at least one support element, wherein the support element is formed such that in the storage position, to form at least one segment of the walkable and/or driveable surface, the cover surface rests against the foot element and/or the cargo hold floor.

In the storage position the cover surface thus forms the walkable or driveable surface at least in segments. The cover surface here is supported by the supporting element which transfers the forces acting on the cover surface into the cargo hold floor or the aircraft. This makes the side guide according to the invention very robust.

The at least one support element and/or a rotary joint provided for swivelling a guide element can be formed such that the guide element can be pivoted by less than 90° in relation to the guide position to assume a storage position.

The cover surface can be actively connected with the vertical guide surface and can be tilted in relation to the vertical guide surface to transfer the forces acting on the vertical guide surface into the foot element and/or into the cargo hold floor. The cover surface thus forms a type of cross bracing which in the guide position—when the vertical guide surface is substantially perpendicular to the cargo hold floor—transfers the forces acting on the vertical guide surface at an angle to the foot element and/or cargo hold floor. Thus the side guide can be designed substantially more robust and absorb larger forces in the transverse direction (Y direction).

The latch lug of the latch element can be formed in at least two pieces with a first and a second latch lug element, each of which can be brought with a stop surface into engagement with a stop edge of an engagement recess of the freight items, wherein the latch lug elements are mounted mobile such that the two stop surfaces move away from the stop edges on movement from the locked position into the rest position. An essential point of this aspect of the invention is that the stop surfaces which can be brought into engagement with a stop edge of the engagement recess of the freight items, move away from the opposing stop edges on removal of the latch lug elements from the engagement recesses. The space taken up by the latch lug elements is thus reduced on lowering and hence also the risk of seizing of the latch lug in the engagement recess is substantially reduced. Even if the freight item exerts a force on the latch lug, this can be retracted with low force. This is particularly advantageous if the freight items have to be unloaded quickly and reliably (e.g. ejection during flight).

The latch lug elements can be connected together in opposing synchrony such that on movement of one latch lug element, the other latch lug element is carried with it. This ensures that both latch lug elements of a latch lug always move simultaneously and more or less in synchrony. Furthermore the latch lugs can be designed mechanically substantially simpler as the individual latch lug elements are mutually supporting and only one of the latch lug elements need be activated to change the position of the latch lug.

The latch element can comprise a fixing device for fixing the latch lug in the locked position and/or the rest position. This fixing device prevents the unintended movement of the latch lug from one position to the other. In one embodiment the fixing device comprises at least one fixing spring element for catching the fixing device in the locked position and/or rest position of the latch lug. Amongst others this has the advantage that the latch lug can be fixed in the locked position and/or rest position without further intervention. The side guide can comprise at least one movement lever or a connection for a movement lever to move the lock latch lug out of the rest position into the locked position. Thus it is possible to activate the latch lug manually.

The side guide can have an electric and/or pneumatic drive at least to move the latch lug out of the rest position into the locked position. It is thus possible to move the lock latch lug via a control device.

The latch element can be arranged on the guide element pivotably therewith.

Said object is also achieved by a cargo hold floor element with at least one of the side guides already described, wherein the foot element is formed as an integral part of the cargo hold floor element. Parts of the side guide, in particular the foot element, can reinforce the hold floor element. On an integral connection between the cargo hold floor element and the foot element, the forces acting can be transferred directly to the cargo hold floor. Mounting the side guide in the cargo hold floor is very simple.

Said object is furthermore achieved by a tailgate with at least one cargo hold floor element corresponding to the above description.

U.S. Pat. No. 4,241,890 discloses an aircraft with a loading system which allows freight items to be ejected during flight. Such aircraft are used both in the civil and in the military sector. To eject the freight items during flight, a tailgate or cargo hold hatch is opened and the freight items are ejected via the tailgate.

The tailgate can form part of the cargo hold floor and is then equipped with roller tracks or similar elements for easier transport of the freight items. There are various methods of accelerating the freight items for ejection. Firstly parachutes are thrown from the aircraft which pull the load from the cargo bay, secondly the aircraft is inclined such that gravity or other acceleration forces drive the freight items towards the tail.

When ejecting the freight items, timing is of decisive importance. Just a few seconds determine whether the freight item will be dropped at the correct location or several kilometers from the target region. Furthermore the safety during ejection plays a decisive role. During the ejection of the freight items, the aircraft is in an extremely critical situation in which numerous relevant parameters, e.g. the load conditions, can change within a few seconds. Jamming of the load, a faulty latch element, a non-deploying tow parachute attached to the load etc. can have catastrophic consequences.

Furthermore the forces acting here are extremely high and can rapidly lead to damage to the aircraft, in particular to the aircraft loading system. To take account of these factors, on ejection of freight items extremely high requirements are placed on the pilot and on the personnel operating the loading system.

It is therefore another object of the present invention to provide a device for ejection of freight items from a cargo hold which allows simple, efficient, safe and precise ejection. This object is achieved by a further invention complex.

In particular the object is achieved by a device for ejecting freight items from a cargo hold of an aircraft in the air, wherein the device comprises:
  a. a control unit with a multiplicity of sensor inputs, control inputs and activation outputs,
  b. sensors which transmit the flight status of the aircraft e.g. speed, climb angle, flight path, flight direction and/or acceleration, to the control unit,
  c. latch elements which, by release signals from the control unit, can be brought from a locked position in which the freight items are attached in the cargo hold to a trigger position in which the freight items can be moved out of the cargo hold.

The device has the advantage that on release of the latch elements, the control unit takes into account at least one aircraft status to achieve an optimum ejection result. A trigger position of the latch element can be a position in which the latch element is retracted such that the freight items can pass over it. Secondly a latch element can be in a release position even in extended state, wherein a pre-specified force, where possible from a pre-specified direction, is sufficient to the pass over the latch element.

The device can comprise a parachute deployment device which on an ejection signal from the control unit deploys the parachute devices such that these pull the freight items out of the cargo hold. Thus the control unit can actively control the ejection process. The parachute device allows acceleration of the freight items in relation to the aircraft so that these are moved in the direction towards the tail of the aircraft.

The device can be a manually operated switch device, in particular a dead-man's-handle type switch, which is connected with the control unit such that only on activation of the switch device can the latch elements and/or parachute deployment device be activated. Thus it is possible to suppress ejection until manual confirmation is given by the operating personnel or aircraft captain. Accidental ejection can thus be avoided.

The sensors can comprise a tilt angle sensor and the control unit can be formed such that the parachute deployment device is only triggered when a predetermined minimum angle of tilt is exceeded and/or a predetermined orientation of the aircraft is maintained. There are tilt angles of the aircraft at which secure ejection of the freight items is not possible. The control unit can measure corresponding tilts via the tilt angle sensor and suppress the initiation of the ejection process or the ejection of the freight items.

Secondly the sensors can also be used to determine the orientation of the aircraft in the air. Using the orientation, the tow direction of the ejected tow parachute can be determined and the target accuracy on ejection improved.

The sensors can comprise an opening sensor which transmits an opening state of a cargo hold hatch or tailgate to the control unit. Thus the opening state of the tailgate can be taken into account on ejection.

The sensors can comprise lock sensors which determine at least the locked state and/or at least one position and/or at least one spring pretension of a spring element and/or at least one motor current consumption and/or at least one brake temperature and/or one circuit board temperature and/or at least one phase shift of the input voltage of the latch element. On ejection of the load, the state of the individual latch elements used to secure the freight items plays a decisive role.

Before ejection is initiated, the states of the individual latch elements must be detected so that suitable measures can be taken to guarantee secure ejection. Furthermore a test of the individual latch elements should take place so that it can be ensured that each latch element is in a state ready for operation. Thus it can be determined as early as possible whether secure ejection is at all possible. The above parameters help determine the function state of the latch elements.

The sensors can comprise at least one force measurement device which measures a force with which a parachute device extracts a freight item from the cargo hold, wherein separating devices can be controlled by the control unit such that the parachute device is separated when the force exceeds a predetermined value or the detected sensors values require an interruption of the ejection process. Thus it is possible to establish whether the freight items are seized in the cargo bay or retained by a faulty latch element. In the case of such a situation the parachute devices which exert a corresponding tensile force on the freight items can separate so that the aircraft remains manoeuvrable.

The device can comprise a multiplicity of switch panels arranged in the aircraft to display the status of the device for ejecting freight items and for input of control signals to the control unit. Thus decentral control and monitoring of the device for ejecting freight items is possible.

The sensors can be secondary sensors to detect states of secondary function devices e.g. parachute ejection devices, parachute separating devices, parachute line retraction winches etc. Here the parameters already described with regard to the latch element can be measured.

The device can comprise a test device which is designed to activate at least one latch element before a possible ejection and receive sensor signals in relation to the latch element in order to establish, from comparison of the sensor signals received with nominal values, whether the at least one latch element is suitable for function. The control unit is thus designed to test individual latch elements for function before actual ejection. Often several latch elements are provided to secure a freight item. It is also possible to retract individual latch elements or bring these into a release position without there being a risk of the freight items moving. Thus mechanical elements of the latch elements could be activated to test whether the latch element as such is functioning. In test sequences a spring pretension of a spring element, a motor current consumption, a brake temperature, a circuit board temperature, a phase shift of the input voltage etc. of the latch element can be measured.

The device can comprise a read device, in particular an RFID tag read device, to read a marking attached to the freight item in order to monitor the loading sequence of freight items. Often digital plans exist which allocate a particular freight item to a particular ejection time or a particular ejection position. It is necessary to load the freight items in the cargo hold according to the planned ejection sequence.

The read device here can help monitor and document the loading sequence. The control device can indicate incorrect loading. Alternatively the control device can detect the load configuration via the read device and establish or propose an ejection sequence and/or flight route according to the load configuration.

The read device can be installed close to a cargo hold hatch (e.g. tailgate) or cargo hold door to detect a multiplicity of markings during loading of the cargo hold. The read device can thus be installed so that individual freight items pass this automatically on loading so their marking is detected.

Further advantageous embodiments arise from the sub-claims.

Figure 2:
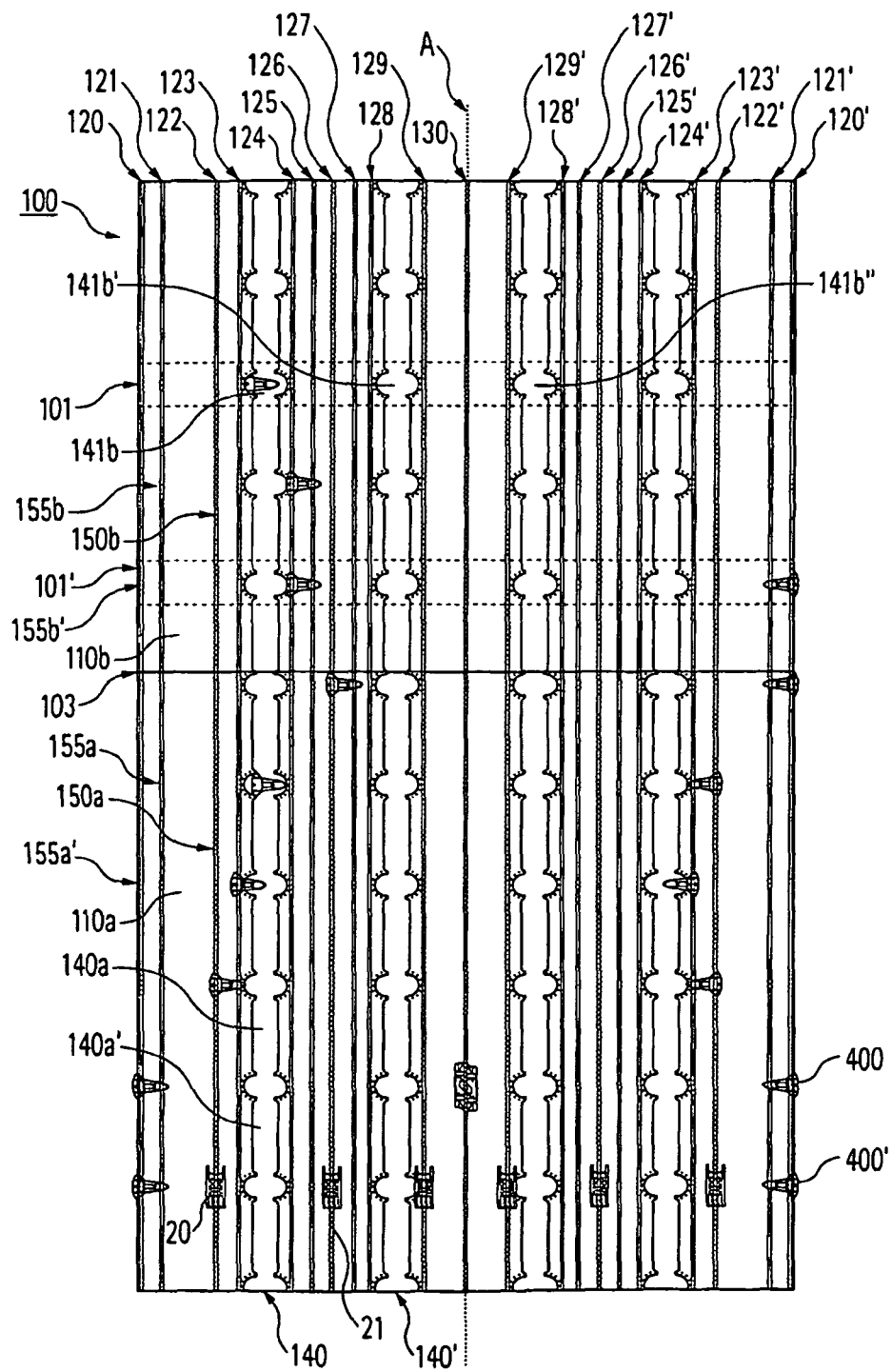
Figure 3:
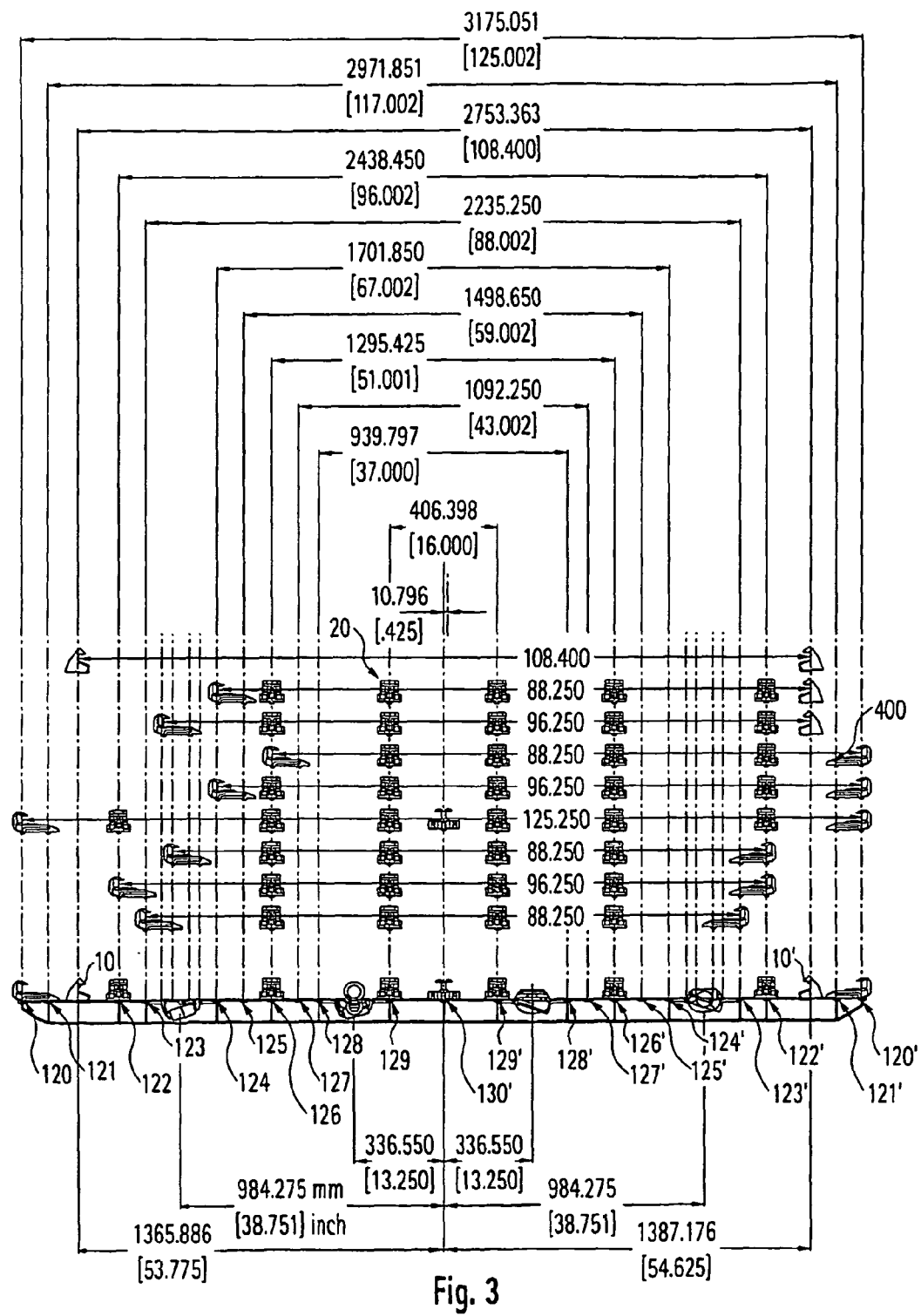
Figure 4:
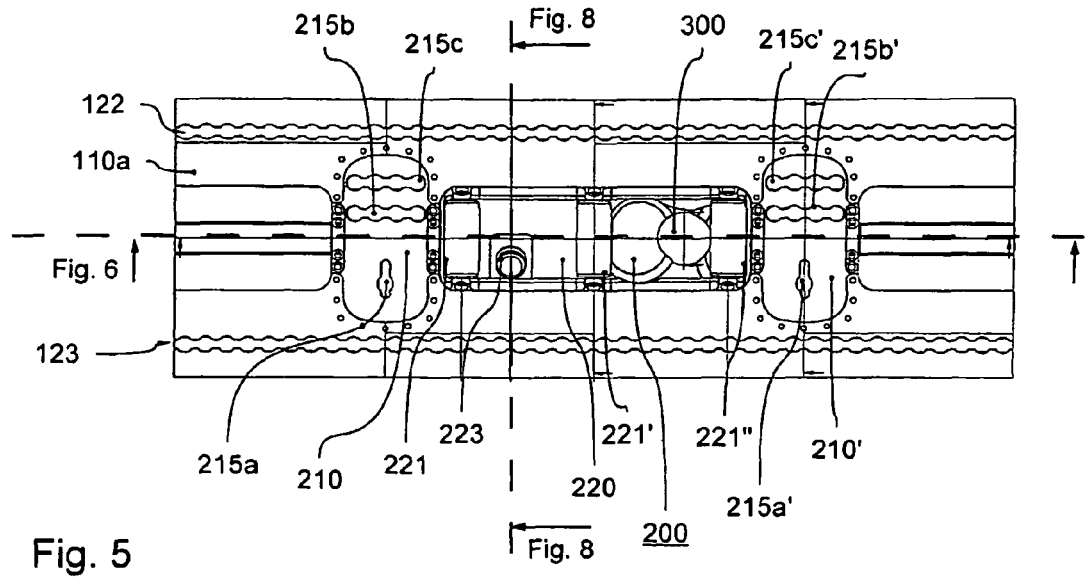
Figure 5:
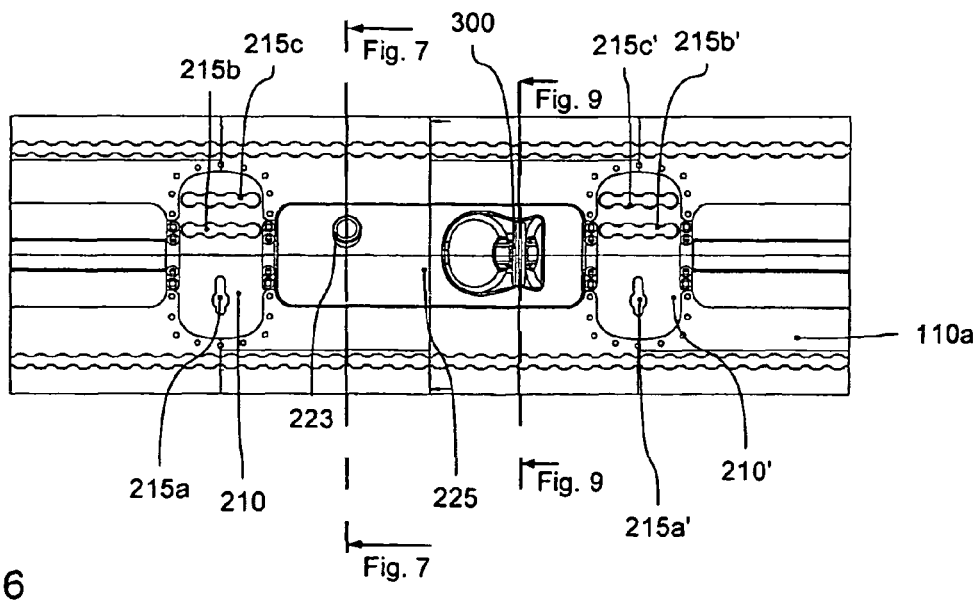
Figure 6:
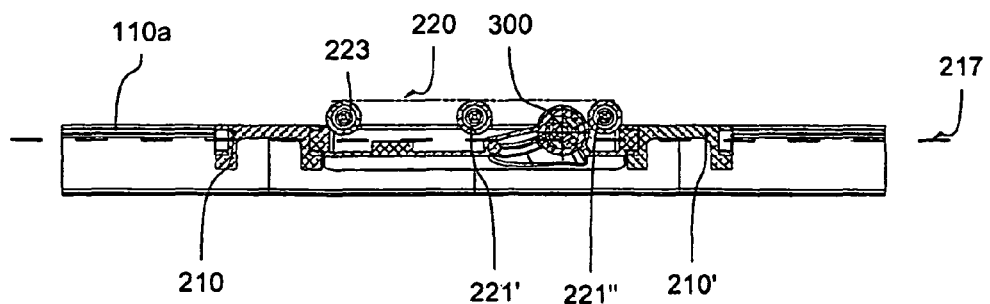
Figure 7:
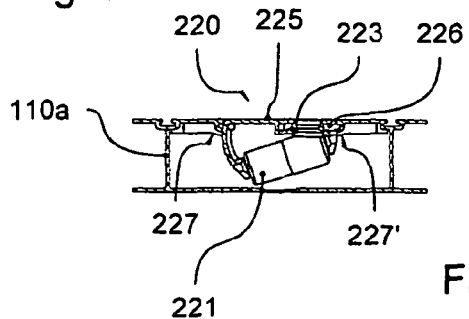
Figure 8:
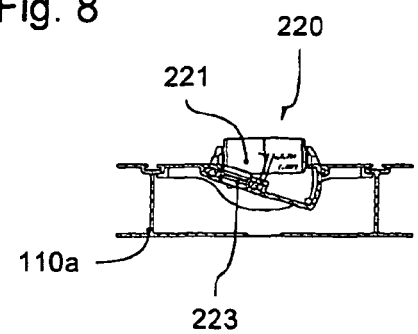
Figure 9:
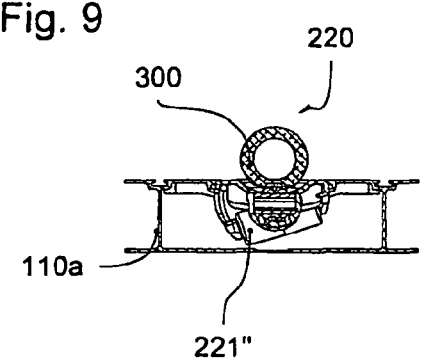
Figure 10:
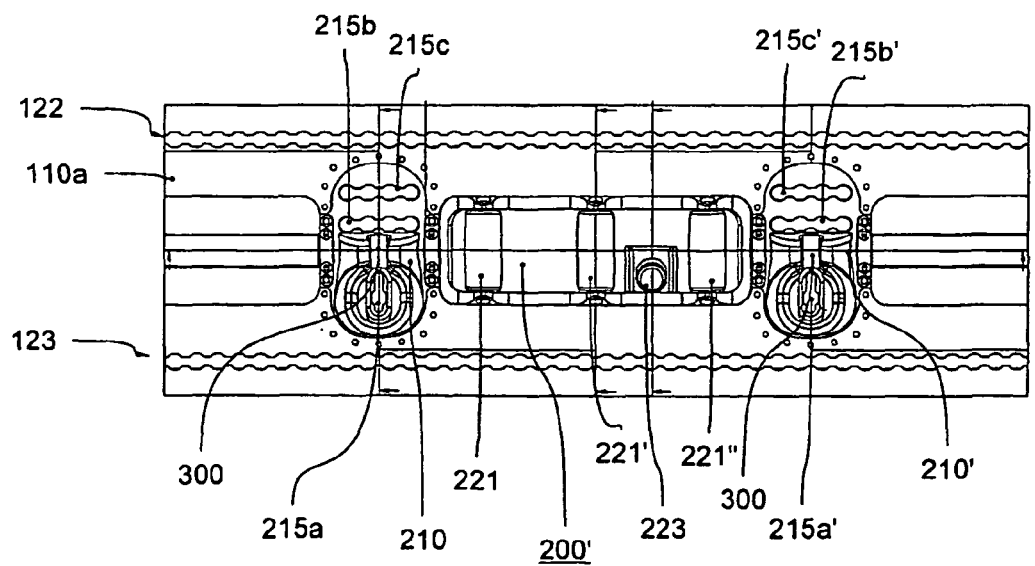
Figure 11:
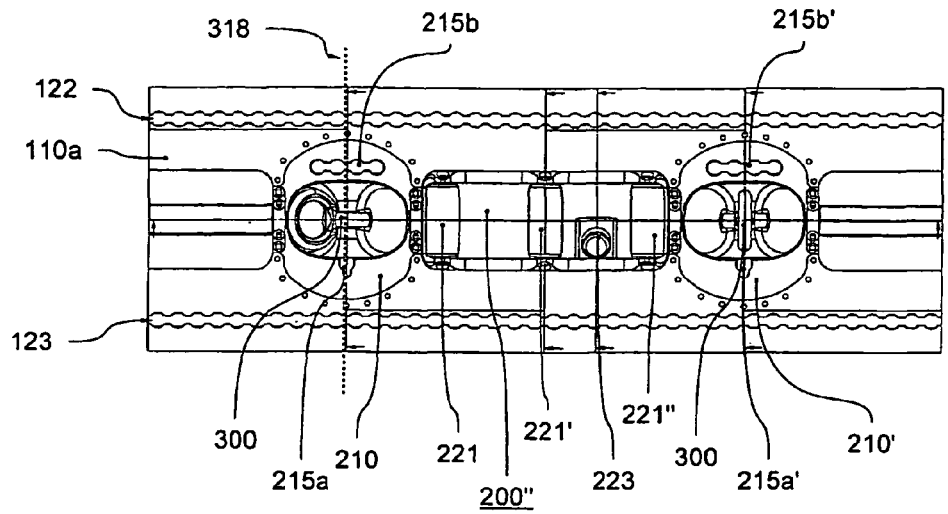
Figure 12:
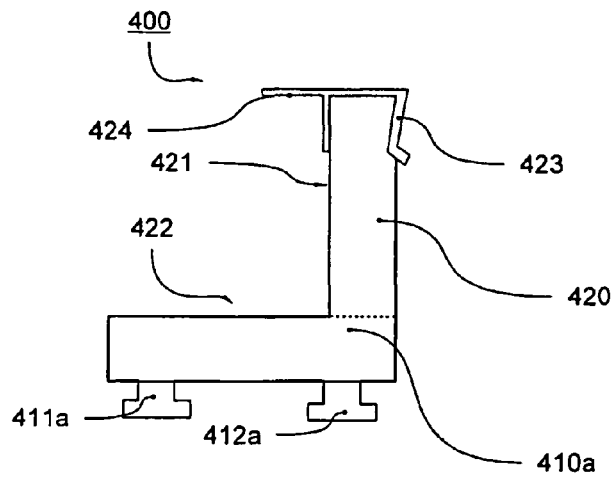
Figure 13:
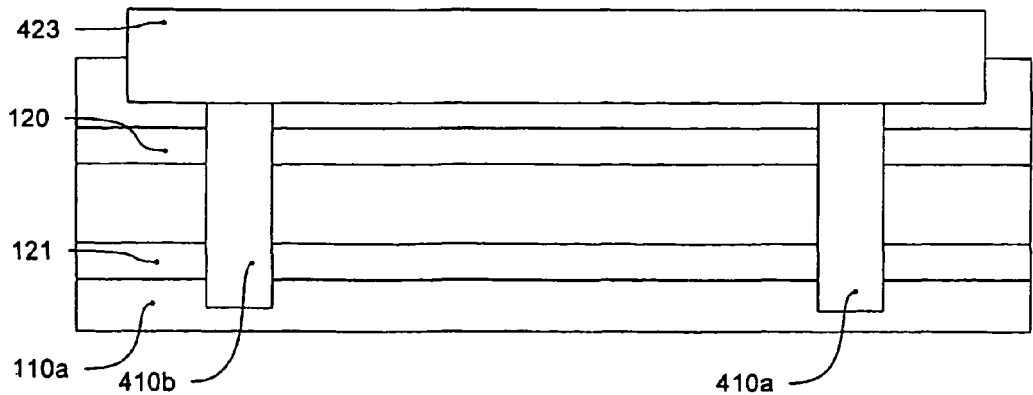
Figure 14:
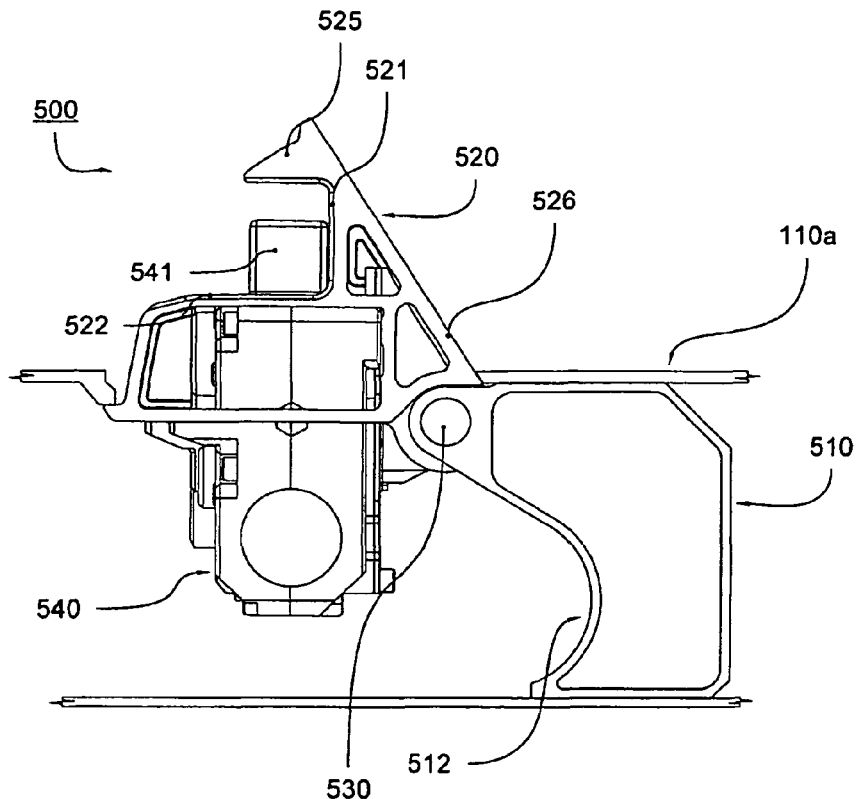
Figure 15:
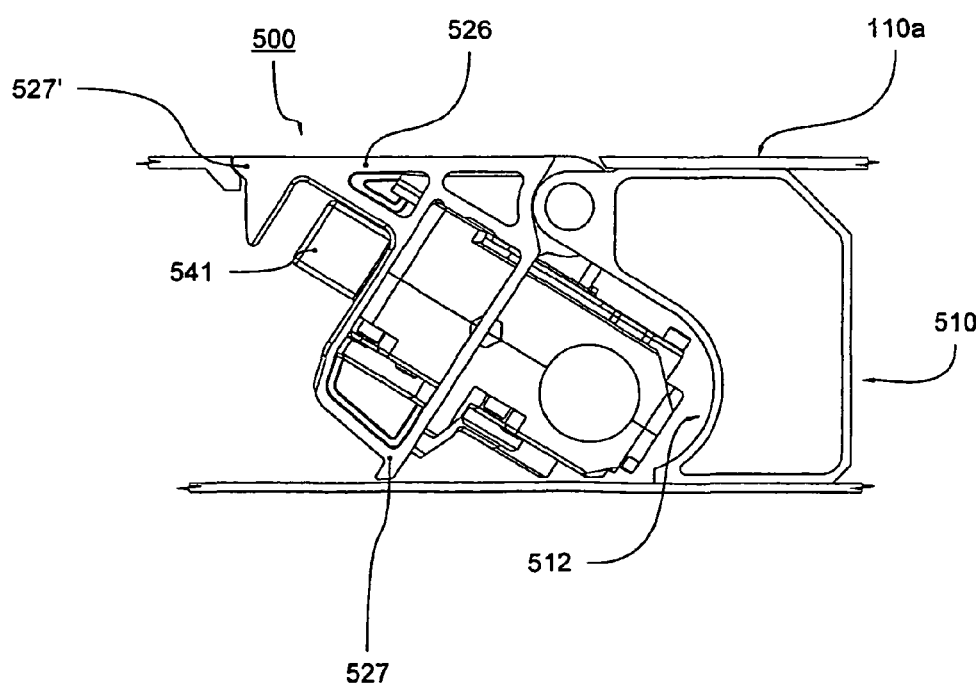
Figure 16:
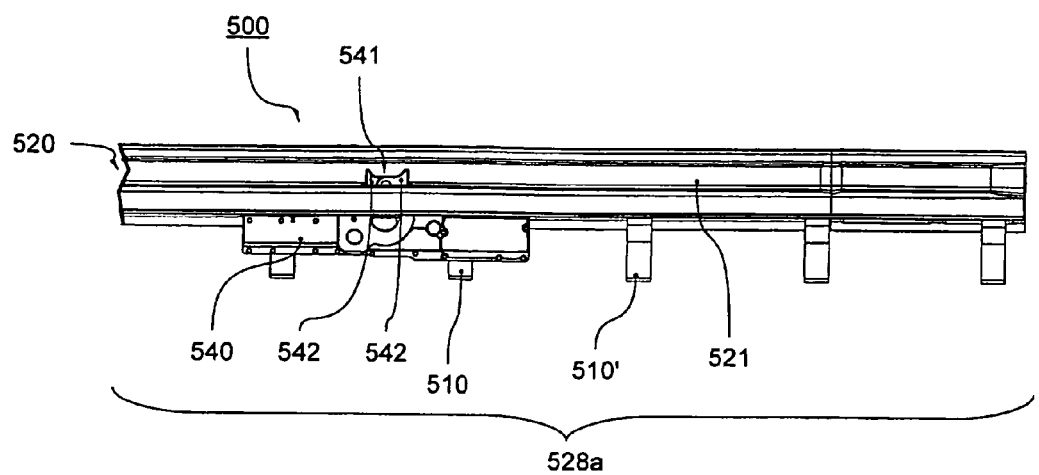
Figure 16:
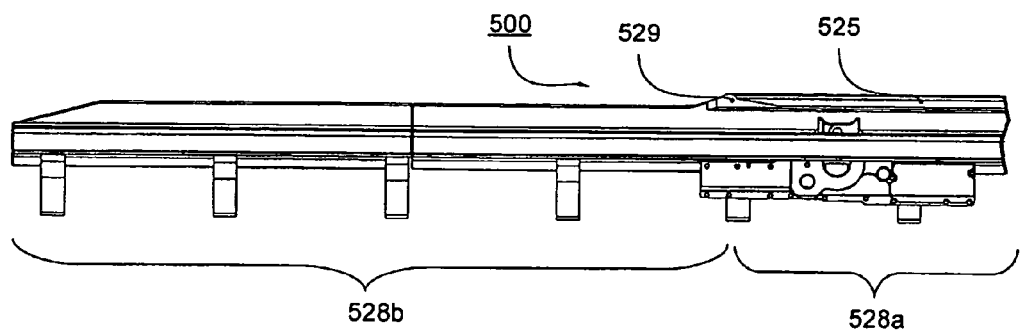
Figure 17:
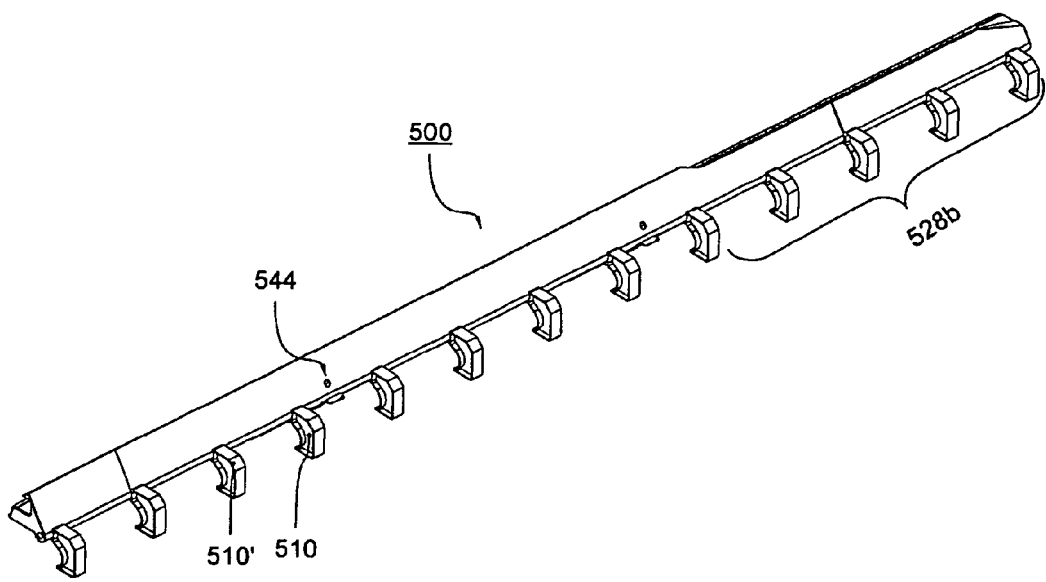
Figure 18:
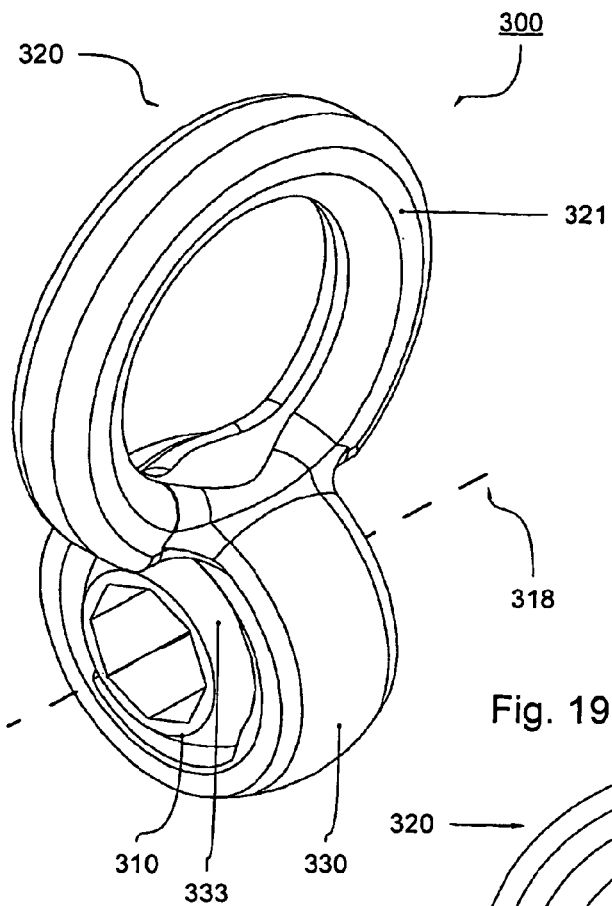
Figure 19:
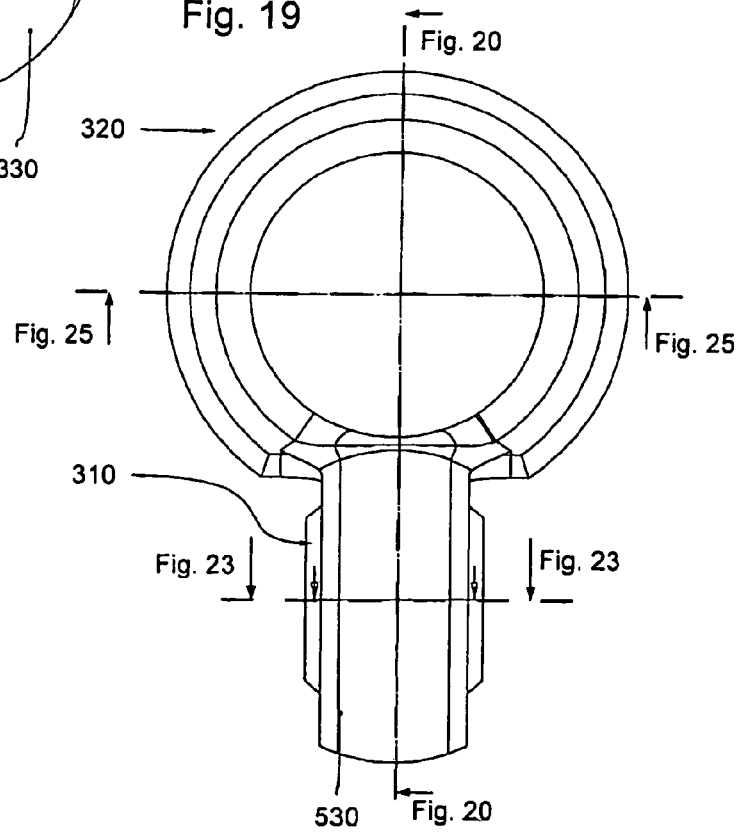
Figure 22:
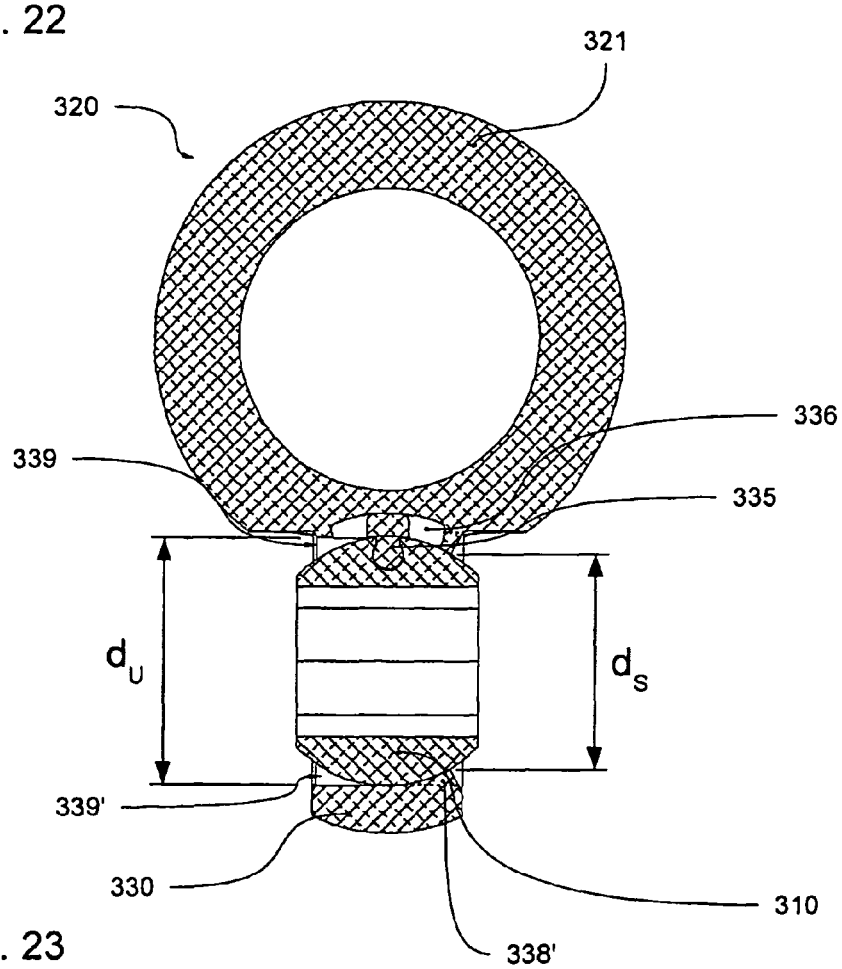
Figure 23:
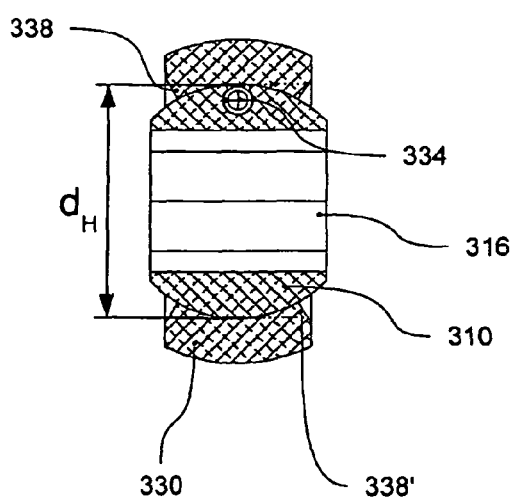
Figure 24:
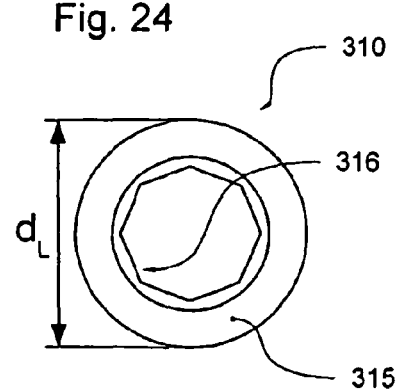
Figure 25:
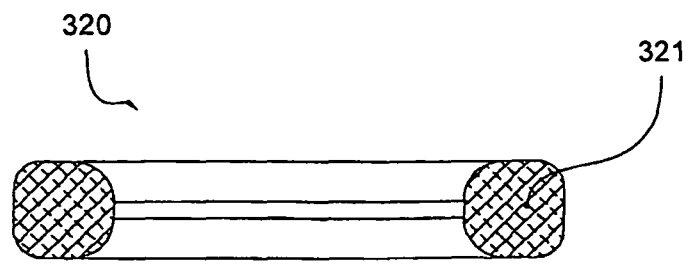
Figure 26:
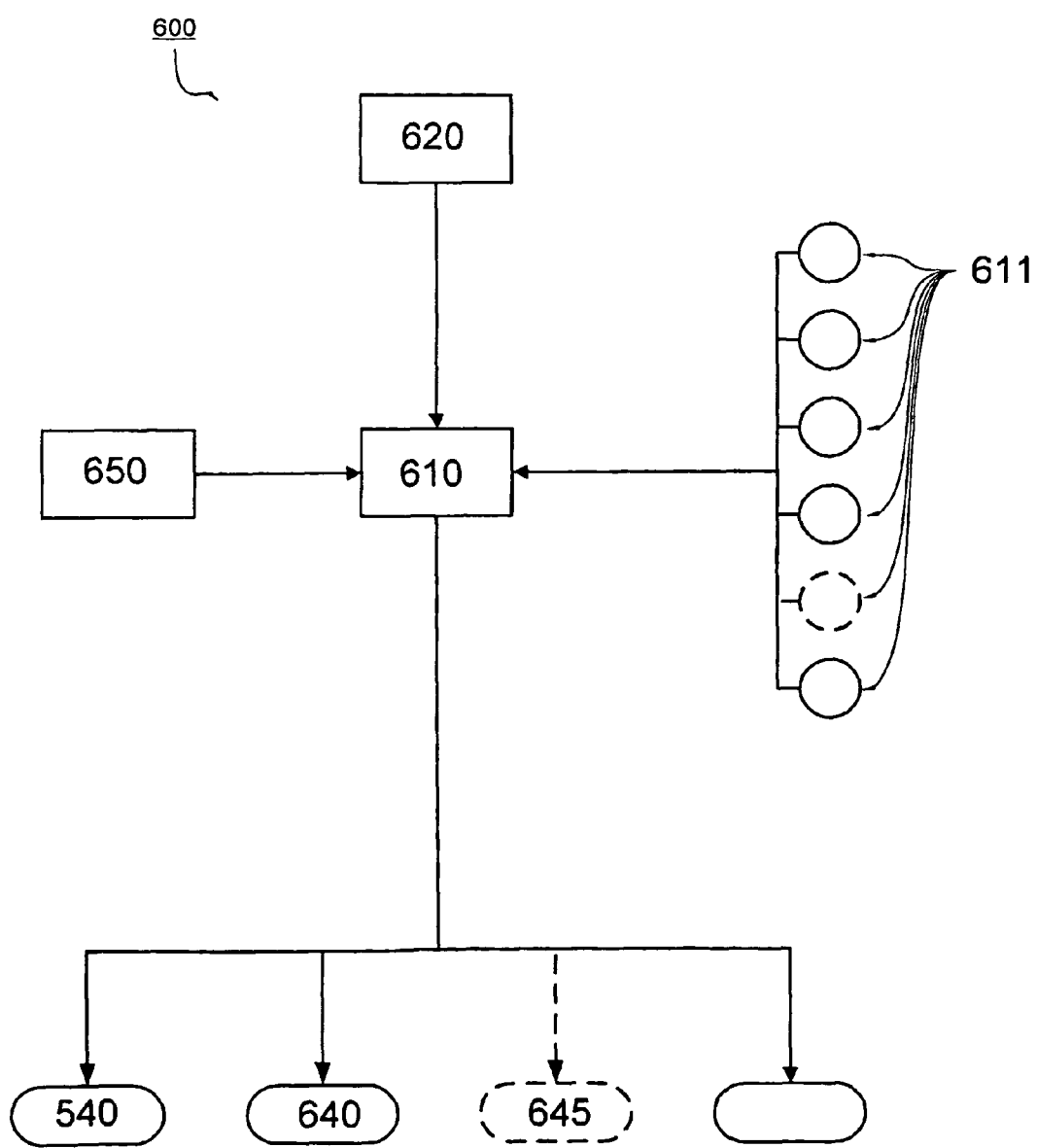
Figure 27:
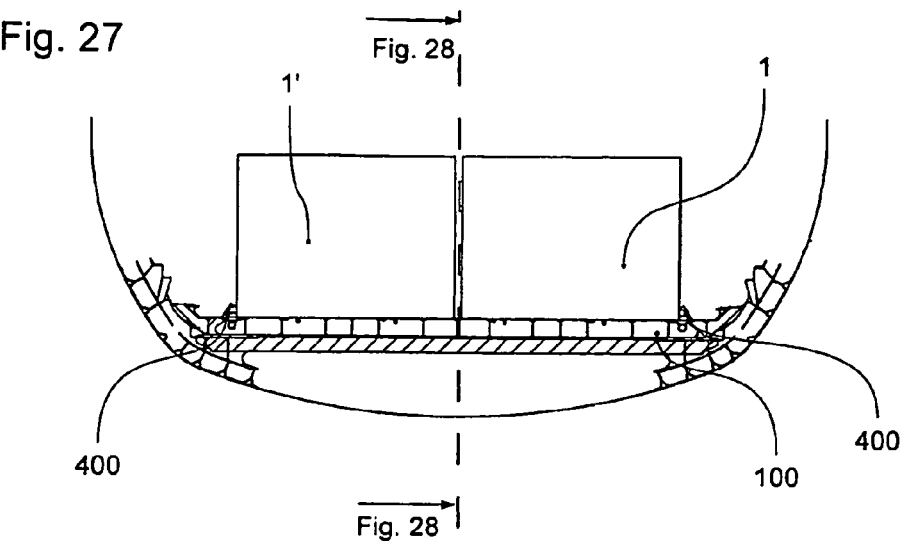
Figure 28:
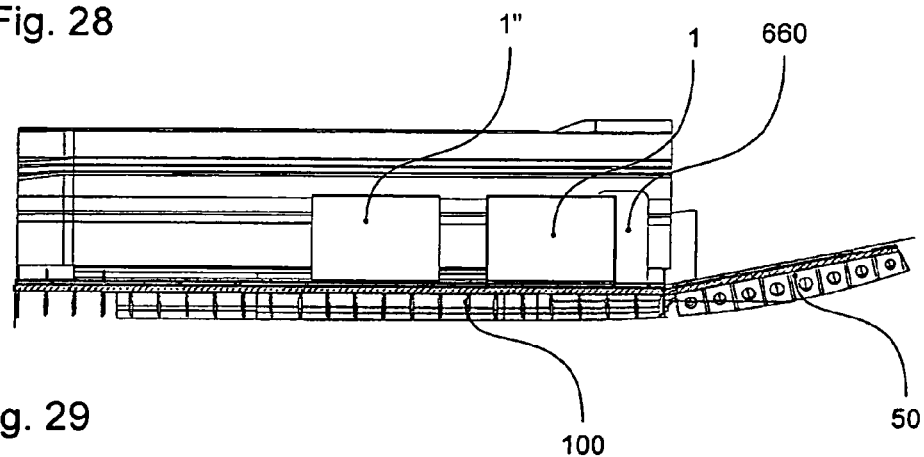
Figure 29:
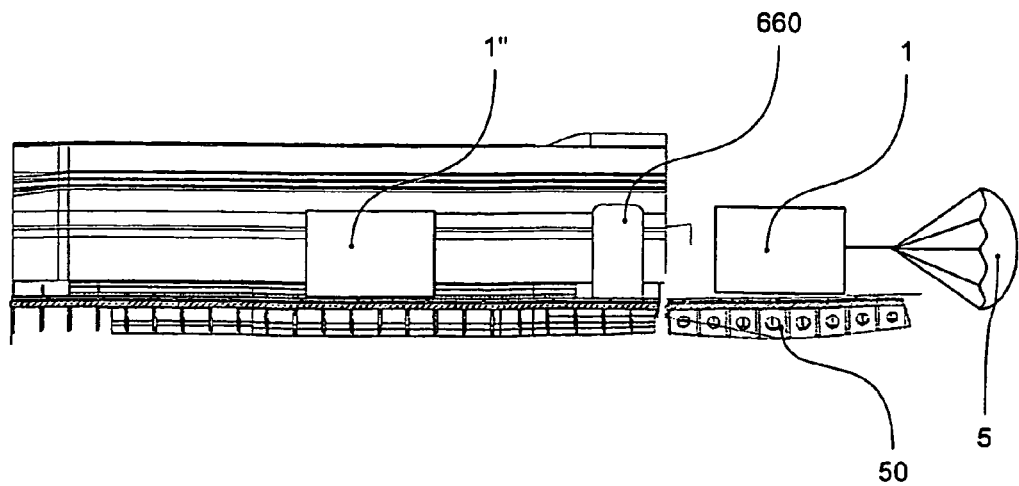
Figure 30:
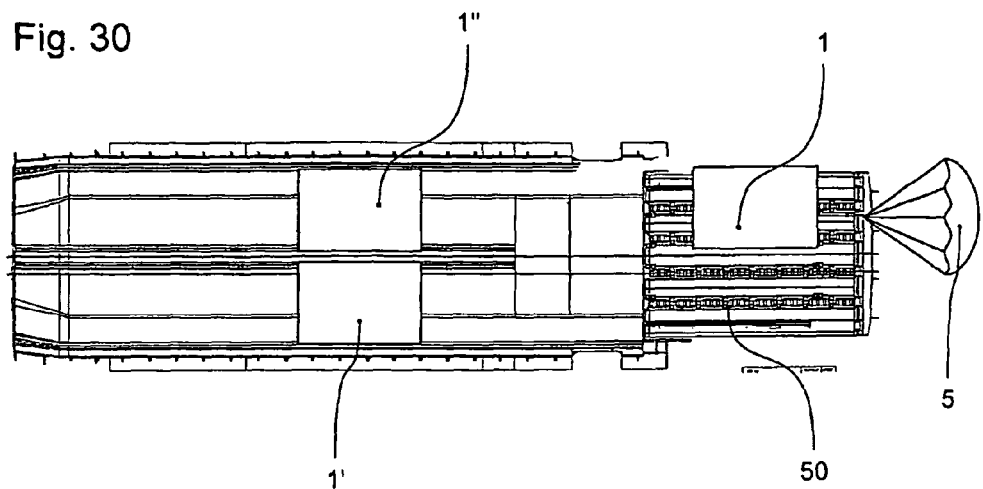
Figure 31:
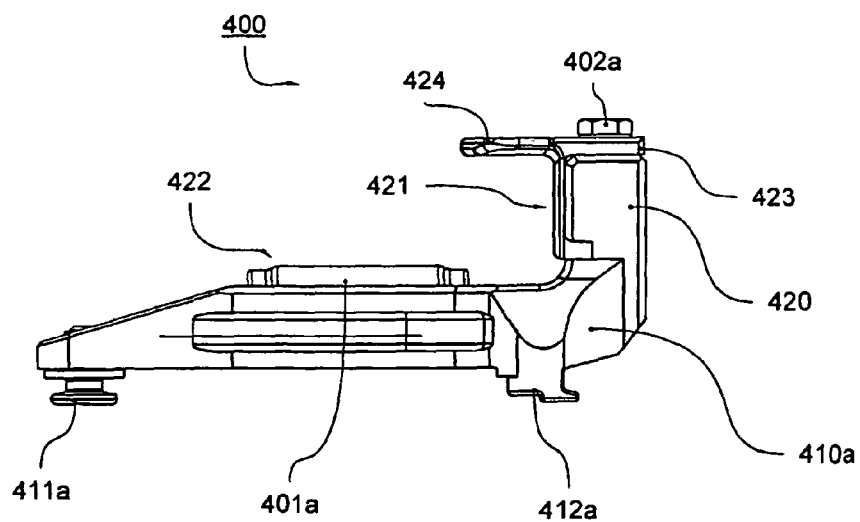
Figure 32:
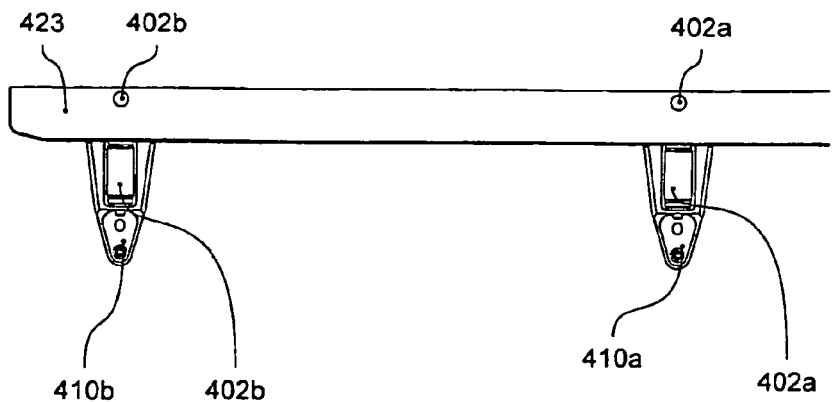
Figure 33:
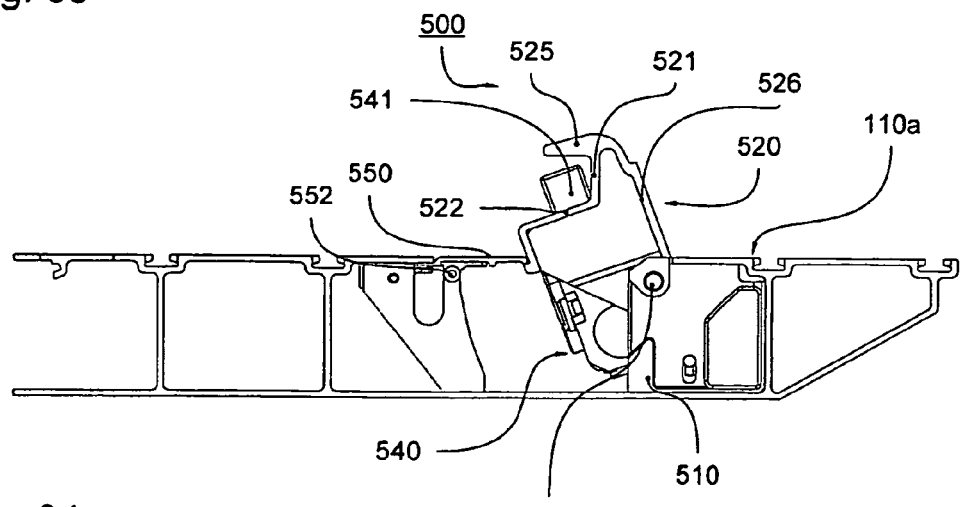
Figure 34:
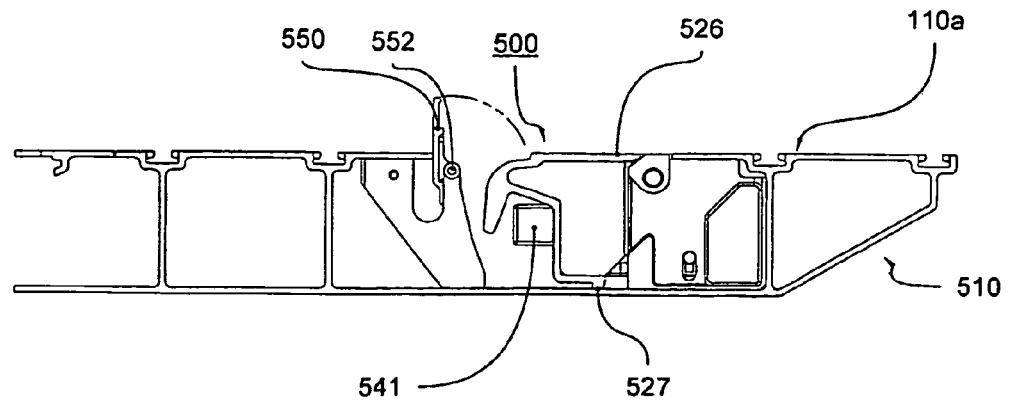
Figure 35:
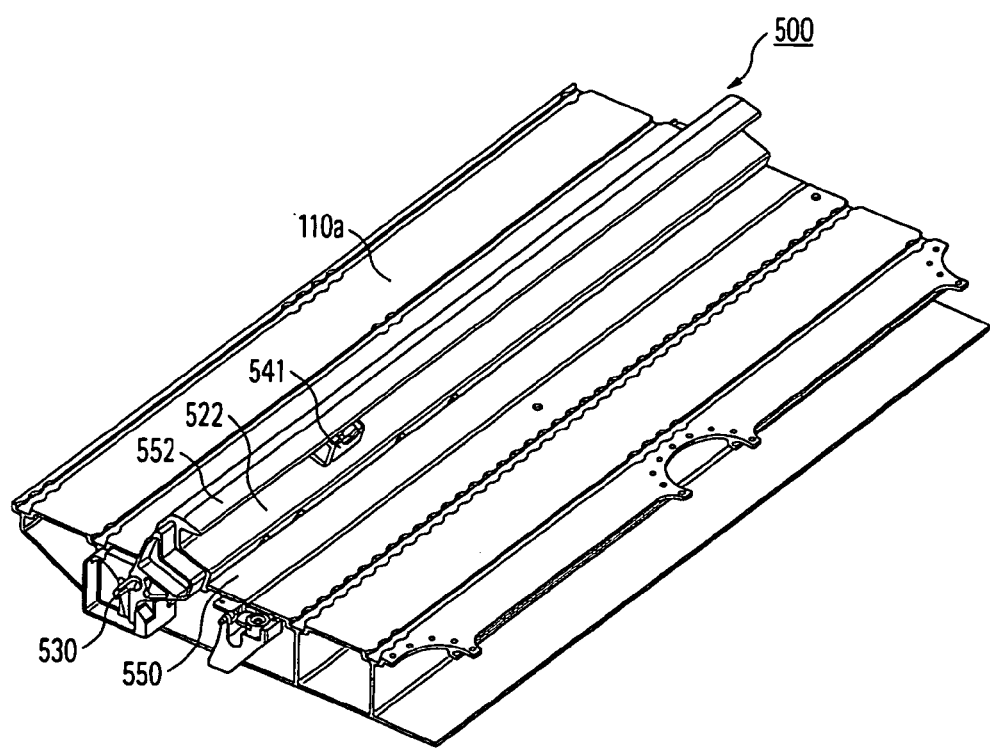

The individual invention complexes are described below with reference to several embodiment examples which will be explained in more detail with reference to drawings. These show:

FIG. 1 a side view of a cargo hold floor;

FIG. 2 a top view of the cargo hold floor of FIG. 1;

FIG. 3 various configuration possibilities for arranging cargo hold loading components on the cargo hold floor of FIG. 1;

FIG. 4 a function element for a cargo hold floor with a turning body in a function position in which a roller unit protrudes into a cargo hold deck;

FIG. 5 the function element of FIG. 4 in a function position in which a walkable surface forms part of the cargo hold deck;

FIG. 6 a longitudinal section through the function element in the function position in FIG. 4;

FIG. 7 a cross section through the function element in the function position according to FIG. 5;

FIG. 8 a cross section through the function element in the function position according to FIG. 4;

FIG. 9 a further cross section through the function element in the function position according to FIG. 5;

FIG. 10 a top view of a further function element for installation in a cargo hold floor with turning bodies and turning body holders, wherein the turning body holders comprise fixing elements oriented in the transverse direction;

FIG. 11 a further function element for installation in a cargo hold floor with turning bodies and turning body holders, wherein the turning body holders comprise fixing elements oriented in the longitudinal direction;

FIG. 12 a side view of a side guide for attaching to a cargo hold floor, wherein a guide element is connected removably with a foot element;

FIG. 13 a top view of the side guide in FIG. 12;

FIG. 14 a side view of a further side guide anchored in the cargo hold floor for attaching to a cargo hold floor, wherein the side guide is in a guide position for fixing a freight item;

FIG. 15 a side view of the side guide according to FIG. 14, wherein the side guide is in a storage position;

FIG. 16 a top view of the side guide from FIG. 14;

FIG. 17 a perspective view of the side guide according to FIG. 14;

FIG. 18 a fixing device for introducing a tensile load into a cargo hold floor, comprising an anchorage and a fixing element which are pivotably connected together;

FIG. 19 a first side view of the fixing device according to FIG. 18;

FIG. 20 a first section through the fixing device according to FIG. 18;

FIG. 21 a second side view of the fixing device in FIG. 18;

FIG. 22 a second section view of the fixing device in FIG. 18;

FIG. 23 a third section through the fixing device in FIG. 18;

FIG. 24 the anchorage of the fixing device in FIG. 18 in a side view;

FIG. 25 a fourth section through the fixing device in FIG. 18;

FIG. 26 a diagrammatic depiction of an electronic device for ejecting freight items;

FIG. 27 a cross section through a loaded cargo hold of an aircraft;

FIG. 28 a longitudinal section through the cargo hold of FIG. 27 before ejection of a freight item;

FIG. 29 the longitudinal section through the cargo hold of FIG. 28 on ejection of a freight item;

FIG. 30 a top view of the cargo hold from FIG. 27 on ejection of a freight item;

FIG. 31 a side view of a further side guide for attaching to a cargo hold floor, wherein a guide element is connected removably with a foot element;

FIG. 32 a top view of a side guide from FIG. 31;

FIG. 33 a side view of a further side guide anchored in the cargo hold floor, wherein the side guide is in a guide position for fixing a freight item;

FIG. 34 a side view of the side guide in FIG. 33, wherein the side guide is in the storage position; and FIG. 35 a perspective side view of a segment of a cargo hold floor with integrated side guide according to FIG. 33.

In the description which follows, the same reference numerals are used for the same parts and those with the same effect. In aircraft construction, normally a Cartesian coordinate system is used to specify the different directions in relation to the aircraft. Here the X axis extends along the longitudinal axis (nose to tail) of the aircraft. The Y axis runs substantially parallel to the extension direction of the wings of the aircraft. The Z axis is perpendicular to the X and Y axes (vertical direction).

FIG. 1 shows a cross section (Y-Z plane) through a cargo hold floor 100 (see FIG. 2) which normally extends in the X-Y plane of the aircraft. A cargo hold floor 100 according to the invention comprises a multiplicity of cargo hold floor elements 110a, 110b which are bolted together to form the cargo hold deck. The cargo hold floor 100 in FIG. 2 comprises two cargo hold floor elements 110a, 110b which are joined together at a cargo hold floor joining segment 103. FIG. 1 shows a side view of the cargo hold floor element 110a, wherein this cargo hold floor element 110a forms the entire cargo hold deck in the transverse direction (Y direction). Cargo hold floors 100 are conceivable which in the transverse direction comprise several cargo hold floor elements 110a, 110b bolted together e.g. 10 or 8 or 6 or 4 or 3 or 2. The cargo hold floor element 110a in FIG. 2 is an extruded panel which is formed substantially symmetrical to a plane of symmetry A (X-Z plane). As FIGS. 1 and 2 show, the cargo hold floor 100 comprises a multiplicity of rails 120 to 130, 120' to 129' running in the longitudinal direction of the aircraft. These rails 120 to 130, 120' to 129' are formed by full seat rail segments 150a, 150b and partial seat rail segments 155a, 155b, 155a', 155b' running along the longitudinal direction of the respective cargo hold floor element 110a, 110b. Rails 120 to 130, 120' to 129' serve to anchor function units, in particular freight loading components such as for example cross bars 10, 10' or longitudinal bars 20 (see FIG. 3). Rails 120 to 130, 120' to 129' can also be formed to receive side guides 400, 400' which anchor the freight items 1, 1', 1" to the cargo hold floor 100 and guide these in the longitudinal direction. Side guides 400, 400' can be used to align freight items 1, 1', 1" e.g. containers and transport these into pre-specified regions of the cargo hold.

In a preferred embodiment example of the cargo hold floor 100, on the sides this has two rails 120, 121 and 121', 120' lying relatively close to each other which are particularly suitable for receiving the side guides 400, 400'. By providing the parallel rail pairs, transverse forces can be transferred particularly well to the cargo hold floor 100. It is sufficient if for side guides 400, 400' partial seat rail segments 155a, 155b, 155a', 155b' are provided which in the longitudinal direction only provide a few holes for mounting the function elements in the rail guide. However full seat rail segments 150a, 150b are particularly suitable for receiving longitudinal bars 20 as these have holes at regular intervals so that the longitudinal bars 20 can be fixed in any position along the longitudinal direction.

FIG. 3 shows a preferred configuration of a cargo hold floor 100 according to the invention. Here seat rail pairs are arranged at intervals of around 317, 297, 223, 170, 150, 139, 109, 94, 41 centimeters. Such a configuration is particularly suitable for receiving freight items 1, 1', 1" of standard width and length. Normal standardised widths of such freight items 1, 1', 1" are 88 inch or approx. 224 cm or 96 inch or 244 cm. FIG. 3 shows a multiplicity of configurations of how the individual freight load components can be arranged on the cargo hold floor 100.

The cargo hold floor 100 furthermore has recessed segments 140, 140' which extend along the longitudinal direction of the aircraft. These recessed segments 140, 140' are formed by individual longitudinal recesses 140a, 140a', 140" and ellipsoid recesses 141b, 141b', 141b" which are provided in the cargo hold floor elements 110a, 110b. The longitudinal recesses 140a, 140a', 140a" and ellipsoid recessed 141b, 141b', 141b" serve to receive function units, for example freight loading components or running surfaces. The function units can preferably be installed from below in the cargo hold floor elements 110a, 110b and bolted to these. A longitudinal recess 140a, 140a', 140a" extending in the longitudinal direction always follows a transverse ellipsoid recess 141b, 141b', 141b". Recessed segments 140, 140' are therefore formed in the longitudinal direction of the cargo hold floor 100 by a chain of alternating longitudinal recesses 140a, 140a', 140a" and ellipsoid recesses 141b, 141b', 141b". The ellipsoid recesses 141b, 141b', 141b" with their elliptical form are preferably arranged above cross members 101, 101' which support the cargo hold floor 100. Threaded bores for attaching the function units surround the ellipsoid recesses 141b, 141b', 141b".

Also cross members 101, 101' are bolted to the cargo hold floor elements 110a, 110b. Thus the forces exerted on the cargo hold floor element 110a, 110b via the function unit can be transferred to the cross members 101, 101' and hence to the aircraft structure.

Recessed segments 140, 140' preferably contain multi-function elements 200, 200', 200". The design of a first multifunction element 200 is shown in FIGS. 4 to 9, that of a second multifunction element 200' in FIG. 10 and that of a third multifunction element 200" in FIG. 11.

A multifunction element 200, 200', 200" according to the invention comprises a turning body 220 and a first and a second turning body holder 210, 210'. The first and second turning body holders 210, 210' are anchored in two adjacent ellipsoid recesses 141b, 141b', 141b" of the cargo hold floor 100 which are connected together by a longitudinal recess 140a, 140a' 140a". The turning body 220 extends along the longitudinal recesses 140a, 140a' 140a" and can rotate about a turning body rotary axis 217 in relation to the turning body holders 210, 210' and hence also in relation to the cargo hold floor 100. The turning body rotary axis 217 in mounted state extends preferably substantially along the longitudinal axis of the aircraft. A multifunction element 200, 200', 200" designed according to the invention has a turning body 220 with several function units. The multifunction elements 200, 200', 200" according to FIGS. 4 to 11 have turning bodies 220 each with two function units, namely a roller unit (see FIG. 4) and a running surface 225 (see FIG. 5). FIG. 4 shows a first function position of the turning body 220 of the first multifunction element 200 in the cargo hold floor element 110a, in which the one roller unit forms part of the cargo hold deck. For these three rollers 221, 221', 221" protrude into the cargo hold deck.

FIG. 5 shows a second function position in which the running surface 225 is at the top and forms part of the cargo hold deck. Let into the running surface 225 is a fixing device 300 with an eye 321.

FIG. 6 shows a longitudinal section through the first multifunction element 200 in the first function position. This clarifies how rollers 221, 221', 221" protrude beyond the cargo hold deck, here formed by the cargo hold floor element 110a. The turning body rotary axis 217 runs parallel to this section.

FIG. 8 shows a cross section through the cargo hold floor element 110a with turning body 220 and roller 221 from FIG. 4. The turning body 220 is in the first function position as shown in FIG. 6.

FIGS. 7 and 9 also show cross sections through the cargo hold floor element 110a, wherein the turning body 220 is in the second function position in which the running surface 225 forms part of the cargo hold deck. FIG. 7 illustrates that the running surface 225 with the cargo hold floor element 110a in the second function position forms a flat walkable surface.

To fix the turning body 220, the multifunction elements 200, 200', 200" have a turning body latch 226 which is pretensioned via a spring element such that in the function positions it snaps into the turning body latch recesses 227, 227' provided for this in the cargo hold floor element 110a. Thus the turning body 220 is fixed in the individual function position. The turning body latch 226 is arranged on the turning body 220 such that it is directly accessible in the first function position. In the second function position the turning body latch 226 can be reached via an opening 223.

According to the invention the individual turning body holders 210, 210' serve not only to hold the turning body 220 but also as fixing points for further freight loading components. Thus the first multifunction element 200 has additional full seat rail segments 215b, 215c, 215b', 215c' and partial seat rail segments 215a, 215a' in which the freight loading components can be fixed. For example a longitudinal latch 20 can be anchored in the additional full seat rail segments 215b and 215c. Full seat rail segments 215b, 215c, 215b', 215c' each run parallel to each other on a running surface of the first turning body holder 210 or second turning body holder 210' and—if the turning body holders are mounted in the ellipsoid recesses 141b, 141b', 141b"—extend in the longitudinal direction (X direction) of the aircraft. The partial seat rail segments 215a, 215a' run on the running surface of the first turning body holder 210 or second turning body holder 210' transverse to the full seat rail segments 215b, 215c, 215b', 215c'.

The second multifunction element 200' (FIG. 10) is formed largely identical to the first multifunction element 200. In each running surface of the turning body holders 210, 210' are two full seat rail segments 215b, 215c or 215b', 215c' and one partial seat rail segment 215a or 215a'. Also at each turning body holder 210, 210' of the second multifunction element 200' is arranged a fixing device 300 which is let into the running surfaces of the respective turning body holder 210, 210'. To lower the fixing device 300 concerned, recesses are provided in the running surfaces. Fixing devices 300 have eyes 321 (see FIG. 18) to attach straps or hooks. In lowered state i.e. in rest position, the eyes 321 lie in a substantially circular recess which extends about the partial seat rail segment 215a, 215a' of the second multifunction element 200' in the respective running surface. Fixing devices 300 can be brought into an active position in which the freight items 1, 1', 1" can be attached to the eyes 321.

The third multifunction element 200" has turning body holders 210, 210' each with a full seat rail segment 215b, 215b' and a partial seat rail segment 215a, 215a'. Furthermore the turning body holders 210, 210' of the third multifunction element 200", like those of the second multifunction element 200', each have a fixing device 300 which however is arranged twisted in the X-Y plane by 90° in relation to the fixing devices 300 of the second multifunction element 200'. The fixing devices 300 of the third multifunction element 200"—when the turning body holders 210, 210' are mounted in the ellipsoid recesses 141b, 141b', 141b"—can be lowered by a movement along the X direction into circular recess arranged in the running surfaces. Thus the fixing devices 300 of the third multifunction element 200" fold away into a rest position when a freight item 1, 1', 1" travels over them in the longitudinal direction. Each of the turning body holders 210, 210' of the third multifunction element 200" for this has two circular recesses which are arranged alternately towards the base or rotary axis 318 (also in FIG. 18) of the respective fixing device 300.

The design of fixing devices 300 for introduction of tensile loads into the cargo hold floor 100 is described in more detail with reference to FIGS. 18 to 25. Such fixing devices 300 can be attached indirectly (e.g. via turning body holders 210, 210') or directly to the cargo hold floor 100. It is also possible to mount the fixing device 300 via a quick connector in one of the rails 120 to 130, 120' to 122'.

As FIG. 18 shows, one embodiment of the fixing device 300 according to the invention has a bearing ring 310, a fixing element 320 and a counter bearing ring 330 integrally connected with the fixing element 320. The tensile load can be transferred to fixing element 320 via an eye 321. Eye 321 is formed circular and twisted by 90° in relation to the counter bearing ring 330. The plane spanned by the counter bearing ring 330 thus stands perpendicular to the plane spanned by the eye 321 (see FIG. 19). The bearing ring 310 is surrounded by counter bearing ring 330 to form a ball joint. Preferably the bearing ring 310 as shown in FIG. 24 has an inner profile 316 which can be pushed onto a bearing axial element (not shown) which is connected rotationally stationary with a cargo hold floor element 110a, 110b, the turning body 220 (FIG. 5) or the turning body holders 210, 210' (FIG. 10 or 11). The longitudinal axis of the symmetrical bearing axial element coincides with a rotary axis 318 about which fixing element 320 can be pivoted. Fixing element 320 can thus be moved from the rest position (see FIG. 10) to the active position (see FIG. 9). As shown in FIGS. 22 and 23, to perform the rotation movement the bearing ring 310 has a convex, constant curvature outer casing surface 313 which is surrounded by a correspondingly formed inner casing surface 333 of a counter bearing ring 330.

The fixing device 300 has a spring element or a coil spring 334 which is tensioned on rotation out of the rest position to the active position and, if no further force acts on the eye 321, moves the fixing device 300 into the rest positions. This means that if no tensile force is exerted on the fixing device 300, this swivels back to the rest position. Fixing element 320 is thus pre-tensioned in the rest position. The coil spring 334, as shown in FIG. 20, is arranged inside the bearing ring 310. To receive the coil spring 334, a radial recess 317 is provided on the bearing ring 310 which extends over an angle range of approx. 180° radially about the rotary axis 318. The radial recess 317, as shown in FIG. 23, is not accessible from the sides of the bearing ring and is formed corresponding to coil spring 334. The coil spring 334 with one end engages directly on the bearing ring 310. The other end of the coil spring 334 contacts a mandrel extension 335 which is anchored by force fit on the counter bearing ring 330 in a mandrel extension receiver 336 provided for this.

To be able to tilt the fixing element 320 in relation to the bearing ring 310—in order to provide further degrees of freedom—the mandrel extension receiver 336 is dimensioned sufficiently generously that the mandrel extension 335 can be moved or tilted along rotary axis 318.

In the preferred embodiment shown, the fixing device 300 can be dismantled for installation for example in the cargo hold floor. Firstly the bearing axial element can be removed. Secondly the bearing ring 310 can be removed from the counter bearing ring 330. As shown in FIG. 23, the inner casing surface 333 is formed at least partly by shoulder segments 338, 338'. These shoulder segments extend substantially radially about the rotary axis 318 and form the edge regions of the inner casing surface 333. The first shoulder segment 333 is interrupted in sections by the interruption portions 339, 339' (see FIG. 21). The interruption portions 339, 339' lie opposite each other and have an interruption inner diameter $d_U$ which is greater than or equal to the bearing ring outer diameter $d_L$ of bearing ring 310. The interruption segments 339, 339' are formed corresponding to the bearing ring 310 such that the bearing ring 310—when tilted by 90° in relation to counter bearing ring 330—can be introduced into or removed from the counter bearing ring. If the bearing ring 310 is rotated such that its axis of symmetry (corresponding to rotary axis 318) lies substantially coaxial to the axis of symmetry of counter bearing ring 330, it is not possible to remove the bearing ring 310 from the counter bearing ring 330 as shoulder segments 338, 338' with a shoulder segment inner diameter $d_S$ smaller than the bearing ring outer diameter $d_L$ retain the bearing ring 310 in the counter bearing ring 330. In this state the fixing device 300 can be used to receive tensile forces. The integrated bearing axial element prevents the bearing ring 310 as described above from being tilted by 90° in the installed state. However a degree of tilting along rotary axis 318 is possible so that the eye 312 can be oriented such that an active tensile force can be transferred optimally into the bearing axial element and thus to the cargo hold floor 100. The bearing ring 310 and the counter bearing ring 330 thus form a type of rotary joint for pivoting fixing of the eye 312 to the bearing axial element.

FIG. 25 shows a section through fixing element 330.

FIG. 12 shows a further complex of the invention, namely the side guide 400 in side view, wherein this forms an angular body consisting of a foot element 410a and a guide element 420. The foot element 410a has a front fixing element 411a and a rear fixing element 412a which are formed to anchor the side guide 400 in rails 120 to 130, 120' to 129' in rails 120, 121 in particular as shown in FIG. 13. Preferably the guide element 420 comprises a guide rail 423 arranged on several foot elements 410a, 410b. In the embodiment example shown in FIGS. 12 and 13, the guide rail 423 is clipped onto the guide element 420. Guide element 420 together with the guide rail 423 forms a vertical guide surface 421 suitable for guiding freight items 1, 1', 1" along the longitudinal direction of the aircraft. Foot element 410a has a horizontal guide surface 422 arranged at right angles to the vertical guide surface 421. This horizontal guide surface 422 is formed to support the freight items 1, 1', 1" in the Z direction. It can also be fitted with roller elements to facilitate movement of the freight items 1, 1', 1" in the X direction.

Preferably the guide rail 423 has a guide rail extension 424 extending substantially parallel to the horizontal guide surface 422 and formed to surround the freight items 1, 1', 1" at least in part. Thus segments of freight items 1, 1', 1" are clamped between the horizontal guide surface 422 and the guide rail extension 424 so that the freight items 1, 1', 1" are secured in the vertical direction (Z direction).

In a further embodiment example the side guide 400 can comprises a guide element 420 connected integrally with the guide rail 423. This guide element 420 can be attached removably on the foot element 410a or foot element 410b. For example the foot elements 410a, 410b can have threads in which can be screwed fixing bolts arranged on guide element 420 accordingly.

In a further embodiment example of the side guide 400 this can consist of a single guide element 420 and a single foot element 410a. In this embodiment no guide rail 423 is required. In this case the guide element 420 is also connected removably with the foot element 410a. Any fixing mechanism can be used to connect the individual elements, for example the guide element 420 can be pushed onto the foot element 410a. In another embodiment example a snap catch can be provided to connect the guide element 420 and foot element 410a.

A further side guide 400 is shown in FIGS. 31 and 32. The foot element 410 is integrally connected with the guide element 420 and has a front fixing element 411a and a rear fixing element 412a to connect with a rail 120 to 130, 120' to 129'. A horizontal guide surface 422 has a guide roller 401a so that freight items 1, 1', 1" can be transported with low friction along the longitudinal direction of the aircraft. A guide rail 423 is hooked into guide element 420 and bolted to this via a fixing bolt 402a. The guide rail 423 can thus be installed and removed. Also the side guide 400 in FIGS. 31 and 32 has a guide extension 424. Preferably the guide rail 423 is attached to at least two foot elements 410a, 410b. The second foot element 410b is formed substantially identical to the first foot element 410a. It also has a guide roller 401b and a fixing bolt 402b for attaching the guide rails.

A further side guide 500 according to the invention arises from FIGS. 14 to 17. An essential aspect of this side guide 500 is its swivellability. Side guide 500 can also be divided roughly into a foot element 510, 510' and a guide element 520. As shown in FIG. 14, the guide element 520 is pivotably connected with foot element 510 via a rotary joint 530. Further rotary joints 530 are preferably provided on further foot elements 510. In total the guide element 520 as shown in FIGS. 16 and 17 extends over several foot elements 510, 510'. The foot elements 510, 510' are formed to be connected with a cargo hold floor element 110a, 110b, e.g. the cargo hold floor element 110a. In the embodiment example shown in FIG. 14 the foot element 510 is an integral component of the cargo hold floor element 110a. The guide element 520 has a vertical guide surface 521, a horizontal guide surface 522 and a guide protrusion 525. In total the vertical guide surface 521, horizontal guide surface 522 and guide protrusion 525 in cross section form a U-profile which is designed to surround the side edge of a freight item 1, 1', 1". Thus the freight item 1, 1', 1" is mounted on the horizontal guide surface 522, guided along the vertical guide surface 521 and secured by means of the guide protrusion 525 such that the freight item 1, 1', 1" cannot spring out of the guide element 520 in the vertical direction.

The guide element 520 has a frame to provide the vertical guide surface 521 and horizontal guide surface 522. The frame also serves to transfer the forces acting on the guide element 520 to the cargo hold floor 110a and/or foot element 510, 510' and to partly form the rotary joint 530. This frame essentially comprises two flat elements inclined to an acute angle to each other which receive the further parts of the guide element 520. The flat elements extend—when the side guide 500 is mounted in or on the cargo hold floor 100—along the longitudinal direction of the aircraft and assumes an angle of around 60° to each other in the embodiment example shown in the figures. The rotary joint 530 lies substantially in the intersection region of these flat elements. The opposite open side forms the U-profile to receive the freight item 1, 1', 1". The upper flat element forms a cover surface 526.

One particular benefit of the side guide 500 is that this can be swivelled out of a guide position (see FIG. 14) by means of rotary joint 530 into a storage position (see FIG. 15). In the storage position the cover surface 526 together with the cargo hold floor element 110a holds part of the freight deck. The freight deck is thus substantially flat and can be driven or walked over easily as the guide element 520 does not protrude above the cargo hold floor element 110a. To provide a freight deck construction which is as stable as possible, the cover surface 526 at the open end of the frame has a support section 527' which in the storage position rests on a correspondingly formed segment of the cargo hold floor element 110a. The cover surface 526 is thus mounted via the rotary joint 530 and support segment 527' on the cargo hold floor element 110a and covers an opening in the cargo hold floor element 110a in which the guide element 520 is mounted in the storage position. The lower flat element of the frame of guide element 520 has a further supporting segment 527 which also rests on the cargo hold floor element 110a. For this the distance of the further support segment 537 to the cover surface 526 is dimensioned such that this corresponds to the depth of the opening to receive the guide element 520. The frame of the guide element 520 is thus formed for effective support of the cover surface 526 in the storage position (suitable choice of contact angle of flat elements, suitable dimensioning of frame).

To secure freight items 1, 1', 1" against longitudinal movement in the side guide 500, in particular in the U-profile formed, a latch element 540 is arranged on the frame. This extends substantially parallel to the vertical guide surface 521 and protrudes from below (from the side facing the cargo hold floor element 110a) into the guide element 520. This latch element 540 has a latch lug 541 which in the guide position can be moved between a locked position and a rest position. The movement of the latch lug 541 takes place substantially parallel to the vertical guide surface 521. In the locked position the latch lug 541 protrudes into the U-profile described above such that freight items 1, 1', 1" can be secured in the X direction. For example the latch lug 541 can engage in an engagement recess provided on freight item 1, 1', 1". To activate the latch lug 541, a relatively bulky mechanism is required. This protrudes downward beyond the frame of the guide element 520. The side guide 500 is thus formed such that the correspondingly voluminous structure folds away to the side in the rest position and is received in a latch receiver region 512. By arranging the latch element 540 substantially below the frame of the guide element 520, the mechanism of the latch element 540 can be stowed relatively easily in the storage position. It is possible to provide cargo floor hold elements 110a, 110b which only have a relatively small dimension and nonetheless can receive the entire latch element 540 in the storage position. Preferably the frame i.e. the guide element 520 is produced as an extruded profile.

FIG. 17 shows the entire side guide 500 in a perspective side view with a multiplicity of foot elements 510, 510'. To clarify the functionality and design of the side guide 500, in FIGS. 16 and 17 the cargo hold floor element 110a is not shown. FIGS. 16 and 17 show a particular embodiment of the side guide 500 according to the invention. Viewed in the longitudinal direction of the aircraft, the side guide 500 according to a further invention complex has two different segments namely a retaining segment 528a and an ejection segment 528b. This particular design of side guide 500 is particularly advantageous if it is arranged at a tailgate 50 (see FIGS. 28 and 29) of an aircraft. This particular embodiment of the side guide 500 is suitable for use on ejection of freight items 1, 1', 1" from the cargo hold of an aircraft in the air. On such ejection as for example shown in FIGS. 28, 29, 30, the tailgate 50 of the aircraft is lowered, a parachute 5 is ejected from the aircraft which then pulls a freight item 1 out of the aircraft via the tailgate. Preferably the cargo hold floor elements 110a, 110b on the tailgate 50 form a continuous cargo hold floor 100 when the tailgate 50 is lowered.

According to an invention complex of the present invention, the tailgate 50 has the side guide 500 shown in FIGS. 16 and 17 which facilitates the ejection of freight items 1, 1', 1" during flight. For this the side guide 500 with retaining segment 528a and ejection segment 528b is arranged at the sides of the tailgate 50 such that the ejection segment 528b lies at the rear of the retaining segment 528a. The opposite side of the tailgate 50 comprises a correspondingly formed side guide 500. Where the cargo hold has several tracks for fixing and guidance of freight items 1, 1', 1", further correspondingly formed side guides 500 (e.g. centre rails) must be provided on the tailgate 50. The embodiment example according to FIGS. 27 to 30 for example shows a cargo hold with two parallel freight tracks. In total in such an embodiment four correspondingly formed side guides 500 are arranged on the tailgate 50 in order to guide the individual freight items 1, 1', 1" in pairs on ejection. As already shown from FIGS. 14 and 15, the side guide 500 in the retaining segment 528a has a guide protrusion 525 which extends along the longitudinal direction of the aircraft. This guide protrusion 525 is interrupted in the ejection segment 528b such that the freight items 1, 1', 1" can be lifted up out of the side guide 500 by the parachute 5. Preferably the guide protrusion 525 is flattened at an end segment 529 such that the clearance between the horizontal guide surface 522 and the guide protrusion 525 increases in a transitional region between the retaining segment 528a and the ejection segment 525b. Thus the freight items 1, 1', 1", even if lifted early, cannot become jammed between the horizontal guide surface 522 and the guide protrusion 525.

The particular design of side guide 500 for the ejection of freight items 1, 1', 1" during flight has the advantage that the freight items 1, 1', 1" are guided in a longitudinal direction over the entire length of the aircraft up to over the tailgate 50. Thus the freight items 1, 1', 1" follow a pre-specified track. Only in ejection segment 528b is it possible for the freight items 1, 1', 1" to be lifted in the vertical direction out of the side guide 500. Thus secure ejection can be guaranteed irrespective of the angle of incline of the tailgate 50 and the flight path of the parachute 5.

In the embodiment described the side guide 500, as already explained with reference to FIGS. 14 and 15, can be folded up such that the tailgate 50 can be walked or driven over in lowered state of side guide 500 i.e. in the storage position of side guide 500. This lowerability is particularly advantageous if the cargo hold is loaded with vehicles or non-standardised freight items 1, 1', 1". In the embodiment example described the retaining segment 528a of the side guides 500 arranged on the tailgate 50 comprises several latch elements 540. Thus the freight items 1, 1', 1" can be retained, even with the tailgate 50 in an ejection position, until the parachute 5 has deployed and/or ejection is desired. In a particular embodiment the retaining segment 528a can also be used for receiving the freight items 1, 1', 1" for storage when the tailgate 50 is closed. The cargo hold is thus utilised to the optimum.

The latch elements 540 can be remote controlled preferably by means of a drive unit. For secure activation of the latch elements 540 however these have also an activation lever connection 544 so that an activation lever can be connected to guarantee manual swivelling of the latch lug 541 out of the locked position into the rest position.

Preferably the latch lug 541 has two or at least two latch lug elements 542, 542' each of which can be brought into engagement with stop surfaces of an engagement recess on freight items 1, 1', 1". The latch lug elements 542, 542' are mounted mobile such that the two stop surfaces move away from the stop edges on movement from the locked position to the rest position. Thus the latch lug 541 not only retracts downward but becomes narrower so that this can be moved from the locked position into the rest position with relatively little force application.

Firstly the invention complex is clarified in relation to the pivotability of the side guide 500 and in relation to the division into two parts (retaining segment 528a and ejection segment 528b) of the side guide 500 with reference to an embodiment example. For the person skilled in the art however it should be clear that the individual invention complexes can also be implemented separately from each other. Similarly, latch elements 540 are an optional addition and not essential to either of the two invention complexes.

A further side guide 500 which does not have the said division is shown in FIGS. 33 to 35. The side guide 500 is integrated in the cargo hold floor element 110a. It is also composed of a multiplicity of foot elements 510, 510' which are connected via rotary joint 530 with the guide element 520. Thus the side guide 500 from FIGS. 33 to 35 can also be pivoted from a guide position (FIG. 33) into a storage position (FIG. 34). A substantially cuboid latch element 540 is arranged on the guide element 520 such that in the storage position this comes to lie within the cargo hold floor element 110a parallel to the cargo hold floor. A supporting segment 527 supports the guide element 520 in this position against the cargo hold floor element 110a. The frame of the guide element 520 is formed such that a cover surface 526 in the final effect is an extension of the side surface of the cuboid latch element 540. This cover surface 526 in the storage position also forms part of the walkable cargo hold deck.

An essential difference from the embodiment in FIGS. 14 to 17 is that the latch element 540 in the guide position is arranged not vertically but slightly angled in relation to the cargo hold deck and thus also in relation to the cargo hold floor 100. In relation to the guide surface 521, in this position standing vertical to the cargo deck, the latch element 540 is thus also slightly tilted. The latch lug 541 of the latch element 540 protrudes at a slight angle into the receiving region formed by the guide protrusion 525, the vertical guide surface 521 and the horizontal guide surface 522. In particular the latch element 540 is oriented such that the latch lug 541 can be swivelled in a plane which is tilted at an acute angle in relation to the vertical guide surface. In the embodiment example shown in FIGS. 33, 34, the corresponding angle is around 21°. The horizontal guide surface 522 in this embodiment example contacts the vertical guide surface 521 forming an obtuse angle. Thus the horizontal guide surface 522 in the guide position forms a ramp which rises in the direction of the vertical guide surface 521. Where freight items 1, 1', 1" approach the side guide 500 from the side i.e. in the Y direction, the ramp thus formed helps guide the side regions of the freight items 1, 1', 1" into the receiving region. The latch lug 541 can be pivoted substantially vertical to the angled horizontal guide surface 522. By tilting the latch element 540, a construction of the side guide 500 can be achieved which takes up less space. The height of the cargo hold floor element 110a can thus be reduced.

The tilting of the horizontal guide surface 552 furthermore has the advantage that approaching freight items 1, 1', 1" can be continuously braked and a lower spot load occurs on the guide element 520.

To lower the side guide 500 out of the guide position into the storage position, it is necessary to open a cover hatch 515 mounted via a cover hatch hinge 552 on the cargo hold floor element 110a. Then the guide element 520 can be folded down. The cover hatch 550 is brought back to the starting position so that together with the cover surface 526 it forms a flat, walkable floor.

According to a further invention complex of the present invention, the aircraft comprises an ejection control system 600 (FIG. 26) to control and monitor the ejection processes. The ejection control system 600 has a controller 610 receiving a multiplicity of sensor signals 611. For this corresponding sensor signal inputs are provided on the controller 610. Also the controller 610 can have its own sensors to request the sensor signals 611. These sensor signals 611 can give information on the flight status of the aircraft. For example sensor signals 611 can specify a speed, angle of climb, flight path, flight direction and/or acceleration of the aircraft. Furthermore the sensor signals 611 can provide information relating to the freight loading system. They can give this information via an angle of tilt of the tailgate 50, a state of the latch elements 540 or similar. Preferably there are latch sensors in the freight loading system which indicate at least one locked state and/or at least one position and/or at least one spring pretension of a spring element and/or at least one motor current consumption and/or at least one brake temperature and/or one circuit board temperature and/or at least one phase shift of the input voltage of the latch element 540.

The controller 610 is in communication connection with a flight data computer 620 which provides part of the information above (e.g. flight distance, flight direction etc.).

The ejection control system 600 has a multiplicity of actuators activated by the controller 610 to carry out a controlled ejection of the freight items 1, 1', 1". Thus the latch elements 540 distributed over the cargo hold can be moved out of a locked position into a rest position. Preferably at least some of the latch elements 540 of the cargo hold are formed such that they can assume three states, namely a locked position, a deployed position and a rest position. Corresponding latch elements are described in PCT application with reference PCT/EP2009/004486 and PCT application with application reference PCT/EP2009/004485. Furthermore a parachute deployment device 640 and a parachute separating device 645 can be connected to the controller 610. Furthermore active roller units or arbitrarily other function units such as for example the pneumatics of the tailgate can be controlled or activated by the controller 610.

Preferably the ejection control system 600 comprises a manual control device 650 with which the individual functions of the controller 610 can be activated and deactivated. For example the ejection control system 600 can have a deadman's-handle type switch which cooperates with the controller 610 so that only on activation of the switch device can the latch elements 540 and/or parachute deployment device 645 be activated by the controller 610. Preferably the ejection control system 600 comprises a multiplicity of switch panels arranged in the aircraft to indicate states of the ejection control system 600 and for input of control systems to the controller 610. The switch panels are preferably distributed over the cargo hold such that the personnel operating the ejection control system 600 always have access to one of these switch panels.

In an ejection process with the ejection control system 600 according to the invention, the controller 610 recognises the individual target coordinates for the individual freight items 1, 1', 1". As soon as the aircraft approaches a first target coordinate for a first freight item 1, 1', 1" (see FIG. 27) in the cargo hold, the controller 610 lowers the tailgate 50 into an optimum position. The optimum position of the tailgate 50 is normally a position in which the tailgate 50 forms a flat extension of the cargo hold floor 100, so no jamming of freight items 1, 1', 1" can occur when passing over the joint. Corresponding sensors on or in the tailgate 50 can help determine this optimum position. The controller 610 can calculate the incline angle of the aircraft to check whether safe ejection is possible. Frequently an incline angle of the aircraft is preferred in which the released load rolls out of the cargo hold under gravity.

The automatic lowering of the tailgate 50 by the controller 610 is optional. It would also be conceivable for the controller 610 to give a corresponding signal to the operating personnel so that these open the tailgate manually or confirm automatic opening. Before ejection the freight item 1 to be ejected is held by several latch elements 540 arranged on the cargo hold floor 100. The latch elements 540 in the embodiment example described are provided in a pair of side guides 500. The latch elements 540 on the basis of a control signal are brought into a release position in which a predefined force is required to pass over the latch elements 540 (see FIG. 28). Then the controller 610 causes the parachute deployment device 600 to eject a parachute 5 attached to a freight item 1. The parachute 5 exerts sufficient force to pass over the latch element 540 which is in the release position. The freight item 1 is guided by means of the side guides 500 already described until it has left the aircraft. Then the controller 610 can arrange closure of the tailgate 50.

A preferred ejection process thus comprises the following steps:
1. A freight item 1, 1', 1" is prepared for ejection by attachment of a parachute 5.
2. The latch elements 540 are checked for function suitability in a test process to be described in more detail. The spring pretension can be configured for the release position. Thus the force necessary to pass over a latch element into the trigger position can be set.
3. Shortly before ejection, all latch elements 540 except for two latch elements 540 arranged on opposite sides are lowered into the rest position. The remaining latch elements 540 are brought into the release position.
4. The controller 610 arranges ejection of the parachute 5 at the given time.
5. The parachute 5 generates a tensile force which finally leads to release of the remaining latch elements 540. I.e. because of the tensile force, the remaining latch elements 540 are pushed from the release position to the rest position. Further freight items 1, 1', 1" can be ejected in a similar method at further target coordinates.

If a problem occurs during ejection of the freight item 1, 1', 1", the controller 610 can interrupt the ejection. For example a parachute already ejected can be decoupled by means of a parachute separating device 645 so that no further tensile force is exerted on the freight item 1, 1', 1". For example one of the freight items 1, 1', 1" after ejection of the parachute 5 can become seized in the side guides 500. The controller 610 detects this situation in that it measures the force exerted by the parachute 5 on the freight item 1, 1', 1". If this force exceeds a predetermined value at a time at which the freight item 1, 1', 1" is still in the cargo hold, it can be assumed that the freight item 1, 1', 1" has become jammed.

The ejection control system 600 can furthermore comprises a test device which is designed to test the function units required individually for successful ejection. The test device is implemented by the controller 610. For example the test device can be designed to activate individual latch elements 540 before ejection to establish that these are fully functioning. In the embodiment example described a freight item 1, 1', 1" in the ejection position is secured against movement towards the tail or nose of the aircraft by two latch elements 540.

In the preceding test phase, the individual latch elements 540 can be brought alternately into a release position, wherein in each case the other latch element 540 remains in the locked position. If the test device establishes that one of the latch elements 540 is faulty, an ejection can be interrupted early or corresponding counter measures taken.

Preferably the ejection control system 600 comprises several RFID tag reader devices 660 which in the tail region form an RFID gate (see FIGS. 28 and 29). These RFID tag read device 660 are designed to detect RFID tags on the freight items 1, 1', 1" when loading the aircraft via the tailgate 50. Thus the controller 610 knows the positions of the individual freight items 1, 1', 1" in the cargo hold. These positions can be compared with an ejection sequence of freight items 1, 1', 1" so that incorrect loading is avoided. Alternatively the ejection sequence can be adapted such that the correct freight item 1, 1', 1" is ejected at the correct destination or correct target coordinate.

FIGS. 27 and 28 show the freight items 1, 1', 1" in the cargo hold. FIGS. 29 and 30 show the cargo hold during ejection of the freight item 1.

Furthermore a function element according to the invention can have the following embodiments:

EMBODIMENT 1.1

Function element for installation in a cargo hold floor (100) with a cargo hold deck comprising:
- a turning body (220) with various function units e.g. active or passive roller units (221, 221', 221"), latch elements (540), fixing rails, running surfaces (225),
- at least one turning body holder (210, 210') which can be mounted in a recess (140a, 140a', 140a") of the cargo hold floor (100) to mount the turning body (220) pivotably such that the turning body (220) can be fixed in different function positions, wherein the turning body (220) is formed such that in each function position it at least one of the function units forms a segment of or co-shapes the cargo hold deck,
characterised in that
the at least one turning body holder (210, 210') is formed to anchor at least one freight loading component e.g. a fixing element, a guide element or similar to the cargo hold floor (100).

EMBODIMENT 1.2

Function element according to embodiment 1.1,
characterised in that
the turning body holder (210, 210') comprises at least one seat rail segment (215a, 215b, 215c, 215a', 215b', 215c') for anchoring the at least one freight loading component.

EMBODIMENT 1.3

Function element according to any of embodiments 1.1-1.2,
characterised in that
the turning body (220) comprises a roller unit (221, 221', 221") and a running surface (225).

EMBODIMENT 1.4

Function element according to any of embodiments 1.1 to 1.3, in particular embodiment 1.3,
characterised in that
the roller unit (221, 221', 221") comprises at least one roller rotatable about a roller rotary axis and arranged such that the roller rotary axis of the roller is tilted in relation to a plane stand by the running surface (225), in particular has an intersection angle of less than 60°.

EMBODIMENT 1.5

Function element according to any of embodiments 1.1-1.4, in particular embodiment 1.3 or 1.4,
characterised in that
the running surface (225) comprises a fixing element that can be lowered therein, in particular with a fixing ring.

EMBODIMENT 1.6

Function element according to any of embodiments 1.1-1.5,
characterised in that
the at least one turning body holder (210, 210') is formed such that the turning body holder (210, 210') can be connected, in particular screwed, to the cargo hold floor (100), in particular to the cargo hold deck underside of the cargo hold floor (100).

EMBODIMENT 1.7

Function element according to any of embodiments 1.1-1.6,
characterised in that
the turning body (220) comprises a turning body latch (226) to fix the turning body (220) in relation to the cargo hold floor (100) in the individual function positions.

EMBODIMENT 1.8

Function element according to any of embodiments 1.1-1.7, in particular embodiment 1.7,
characterised in that
the turning body latch (226) is arranged such that the turning body latch (226) is accessible from the cargo hold deck top in the function positions.

EMBODIMENT 1.9

Function element according to any of embodiments 1.1-1.8,
characterised in that
the at least one turning body holder (210, 210') is designed for at least partial holding of two turning bodies (220).

EMBODIMENT 1.10

Function element set comprising a multiplicity of function elements according to any of embodiments 1.1-1.9,
characterised in that
the function element set comprises n+1 turning body holders (210, 210') to hold n turning bodies (220), wherein the turning bodies (220) and turning body holders (210, 210') are arranged alternately in a row, wherein at least the turning body holders (210, 210') between two turning bodies (220) are formed such that they hold the two adjacent turning bodies (220), wherein each turning body (220) is held by two turning body holders (210, 210').

Furthermore a side guide according to the invention can have the following embodiments:

EMBODIMENT 2.1

Side guide for mounting on a cargo hold floor (100) of an aircraft, in order to guide freight items in particular containers and/or pallets in the longitudinal direction or X direction of the aircraft, comprising:
at least one foot element (410a, 410b) to introduce the acting forces into the cargo hold floor (100), wherein the foot element (410a, 410b) has fixing elements (411a, 412a) for fixing the side guide in at least one rail (120-130, 120'-129'), and
at least one guide element (420) arranged on the foot element (410a, 410b) with at least one guide surface (421, 422) to guide the freight items,
characterised in that
the guide element (420) is connected at least partially removably with the foot elements (410a, 410b).

EMBODIMENT 2.2

Side guide according to embodiment 2.1,
characterised in that
the side guide comprises at least two foot elements (410a, 410b) and the guide element (420) comprises at least one guide rail (423), wherein the guide rail (423) is attached to the foot elements (410a, 410b).

EMBODIMENT 2.3

Side guide according to any of embodiments 2.1-2.2,
characterised in that
at least one fixing element (441a, 411b) comprises a fast catch lock for fixing the fixing element (411a, 411b) in the rails (120-130, 120'-129').

EMBODIMENT 2.4

Side guide according to any of embodiments 2.1-2.3, characterised in that
the guide rails (423) comprise a protrusion cooperating with an edge area with at least one freight item to fix the freight item in a vertical direction (Z direction) of the aircraft.

EMBODIMENT 2.5

Side guide according to any of embodiments 2.1-2.4, characterised by
at least one latch element (540) with a latch lug (541) which is arranged and formed such that the latch lug (541) can be moved from a rest position into a locked position to fix a freight item in the guide element (520).

EMBODIMENT 2.6

Side guide according to any of embodiments 2.1-2.5, characterised in that
the latch element (540) is arranged on the guide element (520) and formed such that the latch lug (541) can be swivelled parallel to a vertical guide surface (521) of the guide element (520) between the rest position and the locked position.

EMBODIMENT 2.7

Side guide according to any of embodiments 2.1-2.6, in particular embodiment 2.6,
characterised in that
the latch lug (541) is formed of at least two pieces with a first and a second latch lug element (542, 542'), each of which can be brought with a stop surface into engagement with a stop edge of an engagement recess of the freight items, wherein the latch lug elements (542, 542') are mounted mobile such that the two stop surfaces move away from the stop edges on movement from the locked position to the rest position.

EMBODIMENT 2.8

Side guide according to any of embodiments 2.1-2.7, in particular embodiment 2.7,
characterised in that
the latch lug elements (542, 542') are connected together in opposing synchrony such that on movement of the one latch lug element (542, 542'), the other latch lug element (542, 542') is carried with it.

EMBODIMENT 2.9

Side guide according to any of embodiments 2.1-2.8, in particular embodiment 2.7 or 2.8,
characterised by
at least one fixing device for fixing the latch lug elements in the locked position and/or rest position.

EMBODIMENT 2.10

Side guide according to any of embodiments 2.1-2.9, in particular embodiment 2.9,
characterised in that
the fixing device comprises at least one fixing spring element for engaging the fixing device with the latch lug elements (542, 542') in the locked position and/or rest position.

EMBODIMENT 2.11

Side guide according to any of embodiments 2.1-2.10, characterised by
at least one movement lever or a connection (544) for a movement lever to move the latch lug (541) out of the rest position into the locked position.

EMBODIMENT 2.12

Side guide according to any of embodiments 2.1-2.11, characterised in that
the side guide is formed to mount on a side of the cargo hold floor (100).

Furthermore a side guide according to the invention can have the following embodiments:

EMBODIMENT 3.1

Side guide for mounting on a cargo hold floor (100) of an aircraft in order to guide freight items, in particular containers and/or pallets, in the longitudinal direction (X direction) of the aircraft, comprising:
  at least one foot element (510) for introducing the acting forces to the cargo hold floor (100),
  at least one guide element (520) arranged on the foot element (510) to guide the freight items,
  at least one latch element (540) with a latch lug (541) arranged and formed such that the latch lug (541) can be brought out of a rest position into a locked position to fix a freight item in the guide element (520), wherein the guide element (520) is arranged pivoting on the at least one foot element (510) in order to swivel the guide element (520) between a guide position for guiding the freight items and a storage position, wherein the guide element (520) and the foot element (510) in the storage position form a substantially flat, walkable and/or drivable surface.

EMBODIMENT 3.2

Side guide according to embodiment 3.1,
characterised in that
the guide element (520) comprises a vertical guide surface (521) and a horizontal guide surface (522), wherein the at least one latch element (540) is arranged on the guide element (520) and formed such that the latch lug (541) in the locked position protrudes beyond the horizontal guide surface (522).

EMBODIMENT 3.3

Side guide according to one of embodiments 3.1-3.2, characterised in that
the latch element (540) is arranged on the guide element (520) and formed such that the latch lug (541) can be swivelled in a plane substantially perpendicular to the horizontal guide surface (522) between a rest position and a locked position.

EMBODIMENT 3.4

Side guide according to any of embodiments 3.1-3.3, in particular embodiment 3.2 or 3.3,
characterised in that
the side guide is formed such that the horizontal guide surface (522) in the guide position is tilted in relation to the cargo hold floor (100) to form a guide ramp for the freight items.

EMBODIMENT 3.5

Side guide according to any of embodiments 3.1-3.4, in particular embodiment 3.4,
characterised in that
the horizontal guide surface (522) in the guide position is angled at an acute angle, in particular at around 20°, to the cargo hold floor (100).

EMBODIMENT 3.6

Side guide according to any of embodiments 3.1-3.5, characterised in that
the guide element (520) comprises a guide protrusion (525) which on guidance of the freight items engages in a groove provided for this on the freight items or surrounds a base of the freight items in order to receive forces in the vertical direction (Z direction) in relation to the cargo hold floor (100).

EMBODIMENT 3.7

Side guide according to any of embodiments 3.1-3.6, characterised in that
the guide element (520) comprises a cover surface (526) and at least one support element (527, 527'), wherein the support element (527, 527') is formed such that the support element (527, 527') in the storage position supports the cover surface (526) to form at least one segment of the walkable and/or drivable surface against the foot element (510) and/or the cargo hold floor.

EMBODIMENT 3.8

Side guide according to any of embodiments 3.1-3.7, in particular embodiment 3.7,
characterised in that
the at least one support element (527, 527') and/or a rotary joint provided for pivoting the guide element (520) is formed such that the guide element (520) can be swivelled by less than 90° in relation to the guide position to assume a storage position.

EMBODIMENT 3.9

Side guide according to any of embodiments 3.1-3.8, in particular embodiment 3.7 or 3.8,
characterised in that
the cover surface (526) is in active connection with the vertical guide surface (521) and is tilted in relation to the vertical guide surface (521) to introduce the forces acting on the vertical guide surface (521) into the foot element (510) and/or into the cargo hold floor (100).

EMBODIMENT 3.10

Side guide according to any embodiments 3.1-3.9, characterised in that
the latch lug (541) is formed in at least two pieces with a first and a second latch lug element (542, 542'), each of which can be brought with a stop surface into engagement with a stop edge of an engagement recess of the freight items, wherein the latch lug elements (542, 542') are mounted mobile such that the two stop surfaces move away from the stop edges on movement from the locked position into the rest position.

EMBODIMENT 3.11

Side guide according to any of embodiments 3.1-3.10, in particular embodiment 3.10,
characterised in that
the latch lug elements (542, 542') are connected together in opposing synchrony such that on movement of the one latch lug element (542, 542'), the other latch lug element (542, 542') is carried with it.

EMBODIMENT 3.12

Side guide according to any of embodiments 3.1-3.11, in particular embodiment 3.10 or 3.11,
characterised by
at least one fixing device for fixing the latch lug element (542, 542') in the locked position and/or the rest position.

EMBODIMENT 3.13

Side guide according to any of embodiments 3.1-3.12, in particular embodiment 3.12,
characterised in that
the fixing device comprises at least one fixing spring element for engaging the fixing device with the latch lug elements (542, 542') in the locked position and/or rest position.

EMBODIMENT 3.14

Side guide according to any of embodiments 3.1-3.13, characterised by
at least one movement lever or a connection (544) for a movement lever to move the latch lug (541) out of the rest position into the locked position.

EMBODIMENT 3.15

Side guide according to any of embodiments 3.1-3.14, characterised by
an electric and/or pneumatic and/or hydraulic drive at least to move the locking lug (541) out of the rest position into the locked position.

EMBODIMENT 3.16

Side guide according to any of embodiments 3.1-3.15, characterised in that
the latch element (540) is arranged on the guide element (520) to be swivellable therewith.

EMBODIMENT 3.17

Side guide according to any of embodiments 3.1-3.16, characterised in that
the side guide is designed for mounting on a side of the cargo hold floor (100).

EMBODIMENT 3.18

Cargo floor element with at least one side guide according to any of embodiments 3.1-3.17,
characterised in that
the foot element (510) is formed as an integral part of the cargo floor element (110a, 110b).

Furthermore the fixing device according to the invention can have the following embodiments:

EMBODIMENT 4.1

Fixing device for transferring a tensile load to a cargo hold floor (100), in particular to a cargo hold floor (100) of an aircraft comprising:
an anchorage for fixing to the cargo hold floor (100),
a fixing element (320), in particular a hook or an eye (321), to receive the tensile load,
a ball joint for articulated connection of the anchorage with the fixing element (320), wherein the ball joint is formed such that the fixing element (320) can be brought out of a rest position into a working position.

EMBODIMENT 4.2

Fixing device according to embodiment 4.1,
characterised in that
the fixing device is formed, in particular fitted with a recess, such that in the rest position the fixing element (320) can be driven over.

EMBODIMENT 4.3

Fixing device according to any of embodiments 4.1-4.2,
characterised by
a spring element (334) which is arranged and formed such that it pretensions the fixing element (320) in the rest position.

EMBODIMENT 4.4

Fixing device according to any of embodiments 4.1-4.3,
characterised in that
the anchorage comprises an axial bearing that can be connected with the cargo hold floor (100) with a bearing ring (310) with an outer casing surface (313) which extends substantially rotationally symmetrical about a rotation axis, wherein the outer casing surface (313) has a substantially convex constant curvature, and the fixing element (320) comprises a counter bearing ring (330) which to form the ball joint surrounds the bearing ring (310) at least in segments and has a concave inner casing surface (333) formed corresponding to the bearing ring (310), in particular to the outer casing surface (313).

EMBODIMENT 4.5

Fixing device according to any of embodiments 4.1-4.4, in particular embodiment 4.4,
characterised in that
the counter bearing ring (330) for at least partial formation of the inner casing surface (333) has two shoulder segments (338, 338') with an inner diameter ($d_S$) which is smaller than an outer diameter ($d_L$) of the bearing ring (310), wherein the shoulder segments (338, 338') are interrupted in segments for insertion of the bearing ring (310).

EMBODIMENT 4.6

Fixing device according to any of embodiments 4.1-4.5, in particular embodiment 4.5,
characterised in that
at least one of the two shoulder segments (338, 338') has two interruption segments (339, 339') for insertion of the bearing ring (310) which are provided opposite each other in the counter bearing ring (330) and have an interruption inner diameter ($d_U$) which is greater than or equal to the outer diameter ($d_L$) of the bearing ring (310).

EMBODIMENT 4.7

Fixing device according to any of embodiments 4.1-4.6, in particular embodiment 4.6,
characterised in that
the interruption segments (339, 339') are formed substantially corresponding to a profile of the bearing ring.

EMBODIMENT 4.8

Fixing device according to any of embodiments 4.1-4.7, in particular according to any of embodiments 4.4-4.7,
characterised by
a linear axial element to form the axial bearing which is inserted removably into the bearing ring (310).

EMBODIMENT 4.9

Fixing device according to any of embodiments 4.1-4.8, in particular embodiment 4.8,
characterised in that
the bearing ring (310) has an inner profile (316) formed corresponding to the axial element for attaching the bearing ring (310) rotationally fixed to the cargo hold floor (100).

EMBODIMENT 4.10

Fixing device according to any of embodiments 4.1-4.9, in particular embodiment 4.9
characterised in that
the inner profile (316) is a polygonal profile.

EMBODIMENT 4.11

Fixing device according to any of embodiments 4.1-4.10,
characterised by
a seal, in particular a dust seal, to seal the ball joint against external influences.

Furthermore a side guide according to the invention can have the following embodiments:

EMBODIMENT 5.1

Side guide for mounting on a cargo hold floor (100) of a tailgate and/or at the tail of an aircraft for guiding freight items, in particular containers and/or pallets, in the longitudinal (X direction) of the aircraft, comprising:
at least one linear guide element (520) with a vertical guide surface (521) and at least one guide protrusion (525) which on guidance of the freight items engages in a groove provided for this in the freight items or surrounds a base of the freight items to receive forces in the vertical direction (Z direction) in relation to the cargo hold floor (100), wherein the guide element (520) for ejection of the freight items has a retaining segment (528a) and an ejection segment (528b), wherein in the ejection segment (528b) the freight items are not fixed by at least one guide protrusion (525) in the vertical direction (Z direction).

EMBODIMENT 5.2

Side guide according to embodiment 5.1,
characterised in that
the at least one guide protrusion (525) extends substantially over the entire length of the retaining segment (528a).

EMBODIMENT 5.3

Side guide according to any of embodiments 5.1-5.2,
characterised by
at least one foot element (510) for introducing the active forces to the cargo hold floor (100), wherein the guide element (520) is arranged pivoting on the at least one foot element (510) to swivel the guide element (520) between a guide position for guiding the freight items and a storage position, wherein the guide element (520) and the foot element (510) in the storage position form a substantially flat, walkable and/or drivable surface.

EMBODIMENT 5.4

Side guide according to any of embodiments 5.1-5.3, in particular embodiment 5.3,
characterised in that
the guide element (520) comprises a cover surface (526) and at least one support element (527, 527'), wherein the support element (527, 527') is formed such that the support element (527, 527') in the storage position supports the cover surface (526) to form at least one segment of the walkable and/or drivable surface against the foot element (510) and/or the cargo hold floor.

EMBODIMENT 5.5

Side guide according to any of embodiments 5.1-5.4, in particular embodiment 5.4,
characterised in that
the cover surface (526) is in active connection with the vertical guide surface (521) and is tilted in relation to the vertical guide surface (521) to introduce the forces acting on the vertical guide surface (521) into the foot element (510) and/or into the cargo hold floor (100).

EMBODIMENT 5.6

Side guide according to any of embodiments 5.1-5.5,
characterised by
at least one latch element (540) with a latch lug (541) which is arranged and formed such that the latch lug (541) can be moved from a rest position into a locked position to fix a freight item in the guide element (520).

EMBODIMENT 5.7

Side guide according to any of embodiments 5.1-5.6, in particular embodiment 5.6,
characterised in that
the at least one latch element (540) is arranged in the retaining segment (528a).

EMBODIMENT 5.8

Side guide according to any of embodiments 5.1-5.7, in particular embodiments 5.6 or 5.7,
characterised in that
the latch element (540) is arranged on the guide element (520) and formed such that the latch lug (541) can be swivelled in a plane substantially vertical to a horizontal guide surface (522) between the rest position and the locked position.

EMBODIMENT 5.9

Side guide according to any of embodiments 5.1-5.6, in particular according to any of embodiments 5.6-5.8,
characterised in that
the latch lug (541) is formed of at least two pieces with a first and a second latch lug element (542, 542'), each of which can be brought with a stop surface into engagement with a stop edge of an engagement recess of the freight items wherein the latch lug elements (542, 542') are mounted mobile such that the two stop surfaces move away from the stop edges on movement from the locked position to the rest position.

EMBODIMENT 5.10

Side guide according to any of embodiments 5.1-5.9, in particular embodiment 5.9,
characterised in that
the latch lug elements (542, 542') are connected together in opposing synchrony such that on movement of the one latch lug element (542, 542'), the other latch lug element (542, 542') is carried with it.

EMBODIMENT 5.11

Side guide according to any of embodiments 5.1-5.10, in particular embodiment 5.9 or 5.10,
characterised by
at least one fixing device for fixing the latch lug elements (542, 542') in the locked position and/or rest position.

EMBODIMENT 5.12

Side guide according to any of embodiments 5.1-5.11, in particular embodiment 5.11,
characterised in that
the fixing device comprises at least one fixing spring element for engaging the fixing device with the latch lug elements (542, 542') in the locked position and/or rest position.

EMBODIMENT 5.13

Side guide according to any of embodiments 5.1-5.12, in particular according to any of embodiments 5.6-5.12,
characterised by
at least one movement lever or a connection (544) for a movement lever to move the latch lug (541) out of the rest position into the locked position.

EMBODIMENT 5.14

Side guide according to any of embodiments 5.1-5.13, in particular according to any of embodiments 5.6-5.13,
characterised by
an electric and/or pneumatic and/or hydraulic drive to move the latch lug (541) out of the rest position into the locked position.

EMBODIMENT 5.15

Side guide according to any of embodiments 5.1-5.14, in particular according to any of embodiments 5.6-5.14, characterised in that
the latch element (540) is arranged on the guide element (520) to be swivellable therewith.

EMBODIMENT 5.16

Side guide according to embodiment 5.15,
characterised in that
the side guide is formed for mounting on a side of the cargo hold floor (100) or the tailgate.

EMBODIMENT 5.17

Cargo hold floor element with at least one side guide according to any of embodiments 5.1-5.16,
characterised in that
the foot element (5.10) is formed as an integral component of the cargo hold floor element (110*a*, 110*b*).

EMBODIMENT 5.18

Tailgate with a cargo hold floor according to embodiment 5.17,
characterised by
at least two side guides each arranged at the sides of the tailgate.

Furthermore a device according to the invention for ejecting freight items can have the following embodiments:

EMBODIMENT 6.1

Device for ejecting freight items (1, 1', 1") from a cargo hold of an aircraft in the air, comprising:
a. a controller (610) with a multiplicity of sensor inputs (611), control inputs and activation outputs,
b. sensors which transmit a flight state of the aircraft e.g. speed, angle of incline, flight path, flight direction and/or acceleration to the controller (610),
c. latch elements (540) which by release signals from the controller (610) can be brought from a locked position in which the freight items (1, 1', 1") are fixed in the cargo hold to a release position in which the freight items (1, 1', 1") can be moved out of the cargo hold.

EMBODIMENT 6.2

Device according to embodiment 6.1,
characterised by
a parachute deployment device (640) which on an ejection signal from the controller (610) deploys the parachute devices such that these pull the freight items (1, 1', 1") out of the cargo hold.

EMBODIMENT 6.3

Device according to embodiment 6.1 or 6.2,
characterised by
a manually operated switch device (650), in particular a deadman's-handle type switch, which is connected with the controller (610) such that only on activation of the switch device (650) can the latch elements (540) and/or the parachute deployment device (645) be activated.

EMBODIMENT 6.4

Device according to any of embodiments 6.1-6.3,
characterised in that
the sensors comprise at least one tilt angle sensor and the controller (610) is formed such that the parachute deployment device (645) is deployed only when a predetermined orientation of the aircraft is assumed.

EMBODIMENT 6.5

Device according to any of embodiments 6.1-6.4,
characterised in that
the sensors comprise an opening sensor which transmits to the controller (610) an opening state of a cargo hold hatch (50) and/or a tilt angle of the cargo hold hatch (50) in relation to the cargo hold.

EMBODIMENT 6.6

Device according to any of embodiments 6.1-6.5,
characterised in that
the sensors comprise latch sensors which detect at least one locked state and/or at least one position and/or at least one spring pretension of a spring element and/or at least one motor current consumption and/or at least one brake temperature and/or a circuit board temperature and/or at least one phase shift of the input voltage of the latch element (540).

EMBODIMENT 6.7

Device according to any of embodiments 6.1-6.6,
characterised in that
the sensors comprise force measurement devices which measure a force with which the parachute devices (5) extract the freight items from the cargo hold, and that separating devices (645) can be controlled by the controller such that the parachute devices (5) are separated when the force exceeds a pre-determined value.

EMBODIMENT 6.8

Device according to any of embodiments 6.1-6.7,
characterised by
a multiplicity of switch panels arranged in aircraft to display states of the device for ejecting freight items and to input control signals to the controller (610).

EMBODIMENT 6.9

Device according to any of embodiments 6.1-6.8,
characterised in that
the sensors comprise secondary sensors for detecting states of secondary function devices e.g. parachute ejection device (640), parachute separating device (645), parachute line retraction winch.

EMBODIMENT 6.10

Device according to any of embodiments 6.1-6.9,
characterised by
a test device which is designed to activate at least one latch element (540) before a possible ejection and to receive sensor signals relating to the latch element (540) in order to establish, from comparison of the sensor signals received with nominal values, whether the at least one latch element (540) is functioning.

EMBODIMENT 6.11

Device according to any of embodiments 6.1-6.10, characterised by
a read device, in particular an RFID tag read device, to read a marking attached to the freight items to monitor the loading sequence of the freight items.

EMBODIMENT 6.12

Device according to any of embodiments 6.1-6.11, in particular embodiment 6.11,
characterised in that
the read device is installed close to a cargo hold hatch (50) or cargo hold door to detect a multiplicity of markings when loading the cargo hold.

| List of Reference Numerals | |
|---|---|
| A | Plane of symmetry |
| 1, 1', 1" | Freight item |
| 5 | Parachute |
| 10, 10' | Cross bar |
| 20 | Longitudinal bar |
| 50 | Tailgate |
| 100 | Cargo hold floor |
| 101, 101' | Cross member |
| 103 | Cargo hold floor connecting segment |
| 110a, 110b | Cargo hold floor elements |
| 120 to 130, 120 to 129' | Rails |
| 140, 140' | Recess segments |
| 140a, 140a', 140a" | Longitudinal recess |
| 141b, 141b', 141b" | Ellipsoid recess |
| 150a, 150b | Full seat rail segment |
| 155, 155b, 155a', 155b' | Partial seat rail segment |
| 200, 200', 200" | Multifunction element |
| 210, 210' | Turning body holder |
| 215a, 215a' | Partial seat rail segment |
| 215b, 215c, 215b' 215c' | Full seat rail segment |
| 217 | Turning body rotary axis |
| 220 | Turning body |
| 221, 221', 221" | Roller |
| 223 | Opening |
| 225 | Running surface |
| 226 | Turning body latch |
| 227, 227' | Turning body latch receiver |
| 300 | Fixing device |
| 310 | Bearing ring |
| 313 | Outer casing surface |
| 316 | Inner profile |
| 317 | Radial recess |
| 318 | Rotary axis |
| 320 | Fixing element |
| 321 | Eye |
| 330 | Counter bearing ring |
| 333 | Inner casing surface |
| 334 | Coil spring |
| 335 | Mandrel extension |
| 336 | Mandrel extension receiver |
| 338, 338' | Shoulder segment |
| 339, 339' | Interruption segment |
| 400, 400' | Side guide |
| 401, 401b | Guide roller |
| 402, 402b | Fixing bolt |
| 410a, 410b | Foot element |
| 411a | Front fixing element |
| 412a | Rear fixing element |
| 420 | Guide element |
| 421 | Vertical guide surface |
| 422 | Horizontal guide surface |
| 423 | Guide rail |
| 424 | Guide rail extension |
| 500 | Side guide |
| 510, 510' | Foot element |
| 512 | Latch receiving region |
| 520 | Guide element |
| 521 | Vertical guide surface |

| List of Reference Numerals | |
|---|---|
| 522 | Horizontal guide surface |
| 525 | Guide protrusion |
| 526 | Cover surface |
| 527, 527' | Supporting segment |
| 528a | Retaining segment |
| 528b | Ejection segment |
| 529 | End segment |
| 530 | Rotary joint |
| 540 | Latch element |
| 541 | Latch lug |
| 542, 542' | Latch lug element |
| 544 | Activating lever connection |
| 550 | Cover hatch |
| 551 | Cover hatch hinge |
| 600 | Ejection control system |
| 610 | Controller |
| 611 | Sensor signal |
| 620 | Flight data computer |
| 630 | Position determination device |
| 640 | Parachute deployment device |
| 645 | Parachute separating device |
| 650 | Manual control device |
| 660 | RFID tag reader device |
| $d_L$ | Bearing ring outer diameter |
| $d_H$ | Counter bearing inner diameter |
| $d_S$ | Shoulder segment inner diameter |
| $d_U$ | Interruption inner diameter |

The invention claimed is:

1. A cargo hold floor for a cargo hold of an aircraft, the cargo hold floor comprising a multiplicity of panels to form the cargo hold floor, wherein the panels have rail segments to form rails extending over several panels and arranged in a longitudinal direction (X direction) of the aircraft, wherein the rail segments are integral parts of each panel and comprise full seat rail segments and partial seat rail segments for fixing freight loading components to the panel, wherein each panel is formed as an extruded panel such that the full seat rail segments and the partial seat rail segments are at least partially produced during the extrusion process of the panel in one working step, the rail segments including a first rail segment and a second rail segment, the second rail segment being generally parallel to and spaced less than 30 cm apart from the first rail segment, the first rail segment adapted to receive a first fixing element of a first freight loading component and the second rail segment adapted to receive a second fixing element of the first freight loading element such that transverse forces applied to the first freight loading element (Y direction) by freight are transferred by the first freight loading element to the first rail segment and to the second rail segment of the panel, wherein the first freight loading component comprises a side guide having a guide element and a foot element, the foot element including the first fixing element and the second fixing element.

2. The cargo hold floor according to claim 1, wherein the rail segments include a third rail segment and a fourth rail segment, the fourth rail segment being generally parallel to and spaced less than 30 cm apart from the third rail segment, the third rail segment adapted to receive a first fixing element of a second freight loading component and the fourth rail segment adapted to receive a second fixing element of the second freight loading element such that transverse forces applied to the second freight loading element (Y direction) by freight are transferred by the second freight loading element to the third rail segment and to the fourth rail segment of the panel, whereby the freight is secured in the transverse direction (Y direction) by the first freight loading element and the second freight loading element.

3. The cargo hold floor according to claim 1, including additional full seat rail segments or partial seat rail segments to receive freight loading components and for use as fixing points.

4. The cargo hold floor according to claim 3, wherein the additional full seat rail segments or partial seat rail segments have a slight length, in particular less than 50 cm.

5. The cargo hold floor according to claim 1, characterised in that the panels comprise recesses to receive mounting elements, in particular with additional seat rail segments.

6. The cargo hold floor according to claim 5, characterised in that the recesses are formed at least partly over cross members of the cargo hold floor.

7. The cargo hold floor according to claim 1, characterised in that the panels comprise recesses to receive lowerable or swivellable support elements, in particular roller units.

8. The cargo hold floor according to claim 7, characterised in that the recesses are arranged in a grid to transport freight items, in particular containers or pallets, by means of the support elements.

9. The cargo hold floor according to claim 1, characterised in that the cargo hold floor is formed substantially symmetrical to a plane running in particular centrally in the longitudinal direction (X direction) of the aircraft.

10. The cargo hold floor according to claim 1, characterised in that the cargo hold floor in at least one configuration is flat such that vehicles can drive over it.

11. The cargo hold floor according to claim 1, characterised in that the panels are formed as hollow profiles with several chambers, wherein the chambers are arranged in the panels to form a supply or discharge system extending over several panels.

12. The cargo hold floor according to claim 11, characterised in that the supply system is formed for connection to a warm air source, in particular to a take-off from a drive turbine of the aircraft.

13. The cargo hold floor according to claim 1, characterised in that at least one rail is arranged on the edge of the cargo hold floor to receive a side guide.

14. A cargo hold floor for a cargo hold of an aircraft, comprising a multiplicity of panels to form the cargo hold floor, wherein the panels have rail segments to form rails extending over several profile panels and arranged in a longitudinal direction (X direction) of the aircraft, wherein the rail segments are integral parts of the profile panels and comprise full seat rail segments and partial seat rail segments for fixing freight loading components, in particular cross bars or a side guide element, wherein the profile panels are formed as extruded profile panels such that the full seat rail segments and the partial seat rail segments are at least partially produced during the extrusion process of the profile panels in one working step, each full seat rail segment comprising a perforated rail with holes for anchoring a seat or freight to the full seat rail segment arranged regularly over substantially the entire length of the full seat rail segment, each partial seat rail segment comprising a perforated rail with holes for anchoring freight to the partial seat rail segment that are not arranged over substantially the entire length of the partial seat rail segment, the rail segments including a first rail segment and a second fail segment, the second rail segment being generally parallel to and spaced less than 30 cm apart from the first rail segment, the first rail segment adapted to receive a first fixing element of a freight loading component and the second rail segment adapted to receive a second fixing element of the freight loading component, wherein the freight loading component comprises a side guide having a guide element and a foot element, the foot element including the first fixing element and the second fixing element.

* * * * *